United States Patent [19]
Lareau et al.

[11] Patent Number: 5,692,062
[45] Date of Patent: Nov. 25, 1997

[54] ELECTRO-OPTICAL IMAGING ARRAY WITH PROFILED FOWARD MOTION COMPENSATION

[75] Inventors: Andre G. Lareau, Bloomingdale; Brian James, Buffalo Grove; Russell A. Bennett, McHenry, all of Ill.

[73] Assignee: Recon/Optical, Inc., Barrington, Ill.

[21] Appl. No.: 316,734

[22] Filed: Oct. 3, 1994

[51] Int. Cl.$^6$ ............................................. G06K 9/00
[52] U.S. Cl. ............................................. 382/107; 382/154
[58] Field of Search .................. 382/106, 108, 382/154, 107; 356/12; 250/578.1

[56] References Cited

U.S. PATENT DOCUMENTS

| | | | |
|---|---|---|---|
| 3,833,762 | 9/1974 | Gudmundsen | 348/208 |
| 3,915,569 | 10/1975 | Pölzleitner | 355/52 |
| 3,982,255 | 9/1976 | Orlando | 354/70 |
| 4,152,729 | 5/1979 | Hobbs et al. | 348/208 |

(List continued on next page.)

FOREIGN PATENT DOCUMENTS

445038A1  2/1991  European Pat. Off. .

OTHER PUBLICATIONS

R. Augustyn, The KS-146A LOROP Camera System, vol. 309, SPIE Proceedings paper 309-11 p. 76 (Aug. 27-28, 1981).

R. Ruck, The KA-93 Panoramic Camera, vol. 79, SPIE Proceedings, pp. 208-215 (Mar. 24-25, 1976).

R. Ruck, Design Versatility of the Prism Panoramic Camera: The KS-116 and KA-95 Cameras, vol. 309, SPIE Proceedings, paper 309-10 p. 65 (Aug. 27-28, 1981).

(List continued on next page.)

*Primary Examiner*—Joseph Mancuso
*Assistant Examiner*—Anthony H. Kahng
*Attorney, Agent, or Firm*—McDonnell Boehnen Hulbert & Berghoff

[57] ABSTRACT

An electro-optical imaging array provides compensation for image motion due to variations in scene terrain electronically and with no moving parts. Pixel information representing scene information is transferred through the array in column groups. Each column group has its own charge transfer rate U. Successive images of the scene are generated by the imaging array, and the images are correlated by electronic signal processing circuitry to determine the image displacement of a fixed point in the scene between successive images. The image displacement is used to calculate a residual image velocity $U_\delta$ in each column group. As successive images of the scene are generated, the charge transfer rates U for each column group are updated, whereby $U=U_0-U_\delta$, where $U_0$ is the charge transfer rate for the previous exposure, and $U_\delta$ is the residual image velocity in each column group.

25 Claims, 17 Drawing Sheets

U.S. PATENT DOCUMENTS

| | | | |
|---|---|---|---|
| 4,157,218 | 6/1979 | Gordon et al. | 354/66 |
| 4,245,254 | 1/1981 | Svensson et al. | 348/208 |
| 4,303,945 | 12/1981 | Fawcett et al. | 348/208 |
| 4,505,559 | 3/1985 | Prinz | 354/66 |
| 4,600,283 | 7/1986 | Gorsch et al. | 354/66 |
| 4,616,911 | 10/1986 | Zeth et al. | 354/66 |
| 4,654,876 | 3/1987 | Atkins | 382/236 |
| 4,661,849 | 4/1987 | Hinman | 348/416 |
| 4,671,650 | 6/1987 | Hirzel et al. | 356/28 |
| 4,707,735 | 11/1987 | Busby | 348/144 |
| 4,743,971 | 5/1988 | Hugli | 348/157 |
| 4,747,155 | 5/1988 | Dotson | 382/275 |
| 4,764,781 | 8/1988 | Lieb et al. | 354/65 |
| 4,796,090 | 1/1989 | Fraier | 348/147 |
| 4,803,710 | 2/1989 | Elabd | 377/60 |
| 4,814,629 | 3/1989 | Arnold | 348/208 |
| 4,908,705 | 3/1990 | Wright | 348/145 |
| 4,952,809 | 8/1990 | McEwen | 250/342 |
| 4,980,762 | 12/1990 | Heeger et al. | 382/107 |
| 5,155,597 | 10/1992 | Lareau et al. | 348/311 |
| 5,231,502 | 7/1993 | Pfister | 348/250 |
| 5,251,037 | 10/1993 | Busenberg | 348/147 |
| 5,259,037 | 11/1993 | Plunk | 382/291 |
| 5,500,904 | 3/1996 | Markandey et al. | 382/103 |

OTHER PUBLICATIONS

R. Ruck and O. Smith, KS–127A Long Range Oblique Reconnaisaance Camera for RF–4 Aircraft, vol. 242, SPIE Proceedings, paper 242–02 p. 22 (Jul. 29–30, 1980).

Thompson–CSF Tubes Electroniques, THX 31157 Area Array CCD Image Sensor Technical Description, pp. 1–11 (May, 1988).

J. Janesick, Multi–Pinned–Phase Charge–Coupled Device, NASA Tech. Brief vol. 14, No. 8, Item #115, pp. 1–13 (Aug. 1990).

C. Sequin and M. Thompsett, *Charge Transfer Devices*, pp. 152–154, 179 Bell Telephone Laboratories, Academic Press (1975).

M.J. Howes, D.V. Morgan, Eds., *Charge–Coupled Devices and Systems*, pp. 252–254, John Wiley and Sons (1979).

D.F. Barbe, Charge–Coupled Devices, vol. 38 Topics in Applied Physics pp. 26–31 Springer–Verlag (1980).

Fairchild Weston Systems, Inc. *1987 CCD Solid State Imaging Technology*, pp. 124, 125 (1986).

W.G. Rees, *Physical Principles of Renote Sensing*, pp. 85–90, Cambridge University Press (1990).

N. Jensen, *Optical And Photographic Reconnaissance Systems*, pp. 102–124, John Wiley & Sons, (1968).

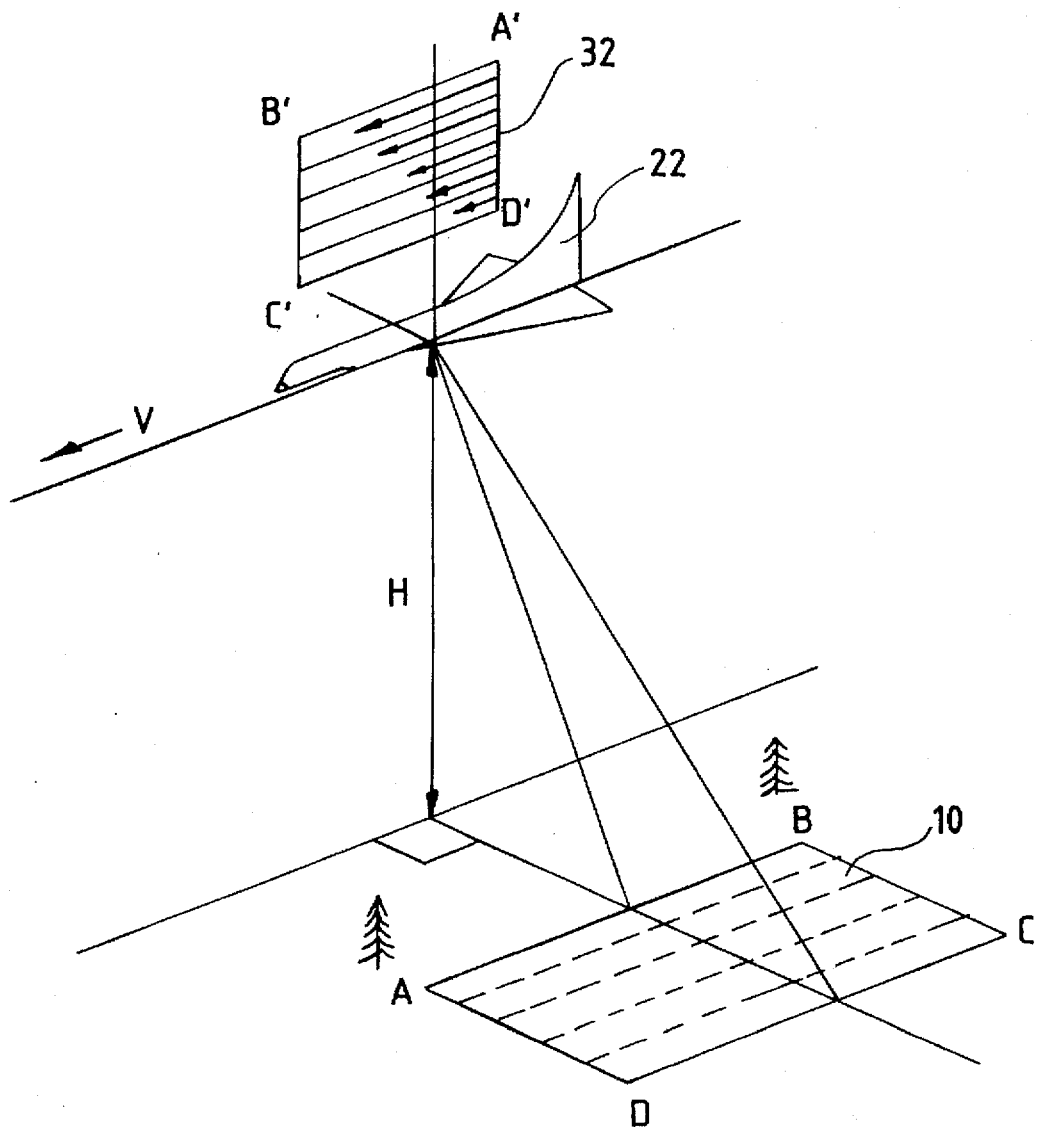

$$d_1 = x'_1 - x_1$$
$$u_\delta = \frac{d_1}{T} = \frac{x'_1 - x}{T}$$

ELECTRO-OPTICAL IMAGING ARRAY WITH PROFILED FOWARD MOTION COMPENSATION

BACKGROUND OF THE INVENTION

A. Field of the Invention

This invention relates generally to motion compensation in imaging systems. More particularly, the invention relates to techniques for processing pixel information representing an image which electronically compensate for the relative motion of an image of a scene with respect to an electro-optical imaging array suitable for carriage by a reconnaissance vehicle. In this invention, variations in the relative motion of the image due to variations in the topography across the scene are compensated for, yielding crisp, clear images from the imaging array.

B. Background Art

Most people who have attempted to photograph a rapidly moving object at close range with a simple box camera have found that the film image of the object is blurred or smeared due to the relative motion of the image over the film. The same effect is observed if the camera is moved during exposure of a stationary scene. If light conditions permit very short exposure times, the image essentially can be "stopped" by increasing shutter speed, and the smearing can be minimized.

Reconnaissance cameras frequently are required to record images in light conditions that prevent sufficiently short exposure times to eliminate image smearing by increases in shutter speed alone. Typically, such cameras are carried by aircraft for recording terrain scenes. Imaging systems used in such cameras comprise not only film, but also electro-optical devices, including charge-coupled devices. In any such camera in which relative motion exists between a scene to be imaged and the imaging system, the recorded image of the scene will be smeared unless some technique is used to compensate for the relative motion. Such techniques commonly are known as "forward motion compensation" or "image motion compensation." Left uncompensated, the smearing and image degradation resulting from the relative motion reduces the information content of the recorded image.

When a camera is aimed vertically at scene of interest directly below an aircraft, the rates of motion of all points of the scene image in the field of view are nearly the same, and the motion can be compensated to avoid smear relatively easily. For example, if the imaging system is film, smear is avoided by moving the film emulsion at the same rate and in the same direction as the motion of the scene image in the focal plane of the camera. However, if the scene of interest is topographically varied, particularly if the aircraft is flying at low altitude, the rates of motion of the scene will accordingly vary. The terrain closest to the aircraft (such as tall buildings or hills) appears to move faster than the terrain that is farther from the aircraft.

When the scene of interest is not directly below the aircraft, but rather is perpendicular to the direction of flight and at an oblique angle, the solution to the problem of image motion compensation becomes difficult, principally because objects at a closer distance to the aircraft appear to be moving faster relative to the aircraft than objects farther away. Similarly, when the scene of interest is forward of the aircraft, the solution to the problem of image motion compensation becomes more difficult because terrain farther ahead appears to be moving slower than terrain closer to the aircraft. In these situations, image motion compensation becomes even more difficult if the topography of the scene of interest is varied.

The specifics of the problem are modified when changes in the aircraft velocity, height above ground, or camera depression angle below horizontal occur. These changes affect the rate of image motion in the focal plane of the camera, and they must be taken into account by a forward motion compensation system.

As noted above, a further contributing factor to image smear is variations in scene topography. For example, the terrain in the field of view of the camera is constantly changing during flight over hilly terrain. Moreover, at any given instant of time, the terrain may not be uniform (i.e., flat) throughout the field of view. One segment of the field of view may comprise relatively flat terrain, while adjacent segments may comprise hills, tall buildings, or trees. These variations in scene topography cause the image motion in the focal plane of the camera to also vary. For example, when a reconnaissance aircraft is flying relatively low (e.g., below 500 feet in altitude above the ground), terrain that is closer to the aircraft, for example, hills, tall buildings, even trees, appear to be moving faster than terrain farther from the aircraft, for example, valleys and level ground. When the reconnaissance aircraft is flying at higher altitudes, larger scale changes in scene topography, such as mountain ranges and adjacent valleys, will result in similar variations in image motion in the focal plane of the camera. The present invention compensates, as best as possible, for such topographical variations in an electro-optical imaging array electronically, and with no moving parts. Moreover, such compensation is continuous, in the sense that successive frames of imagery from the array compensate for terrain variations as the terrain in the field of view varies from one exposure period to the next.

For aerial reconnaissance, electro-optical cameras, particularly those of the charge-coupled device variety, are perceived as superior to film cameras to an increasing extent. In an electro-optical camera, radiation from an image of interest impinges on a solid state device typically having (at least) several thousand picture elements or pixels. The incident radiation is converted into charge packets (pixel information) at the photosites (pixels) and collected in potential wells. The charge packets contain scene information, and upon being transferred out of the device, are converted into electrical signals. One primary advantage of an electro-optical imaging camera is that the scene information can be almost instantaneously recovered from a reconnaissance aircraft to an earth-based station, or can be converted to a video image. Since charge-coupled device imaging cameras have very small pixels closely spaced together, the resolution of a resulting image tends to be very high. Electro-optical imaging cameras can also be made sensitive to particular frequencies of incident radiation. Background information on charge-coupled devices can be found in standard texts such as D. Schroder, *Modular Series On Solid State Devices*, Ch. 3, 4, Addison-Wesley (1987), and in C. Sequin and M. Tompsett, *Charge Transfer Devices*, Bell Telephone Laboratories, Academic Press (1975), and in S. M. Sze, *Physics of Semiconductor Devices*, Ch. 7, John Wiley & Sons, Inc. (1981).

In a linear electro-optical focal plane reconnaissance detector, such as the linear detector of the Wight patent, U.S. Pat. No. 4,908,705, a scene of interest is scanned a line at a time across an array in a direction perpendicular to the array length. Because the means of scanning is provided by the aircraft forward motion, the aircraft must maintain a steady, well defined flight path while the scene is being recorded. Depending on the size of the scene, the recording time for any one target may range between 10 and 20 seconds, or even longer. In a military situation in which the reconnaissance aircraft may be subject to enemy threats, the vulnerability during the recording time may be excessive.

To reduce the time needed to image a scene of interest and thus reduce the time of exposure to hostile threats, a preferred mode of the present invention uses a two-dimensional electro-optical imaging area array, rather than a linear (one-dimensional) array. An area array can image an entire scene instantaneously, rather than a line at a time. Until recently, only relatively small electro-optical imaging arrays have been commercially available, such as those typically used in television cameras. However, larger, high pixel count area arrays suitable for aerial reconnaissance sensors are now feasible. Two scientific imagers used in astronomical applications, the Tektronix TK 1024 CCD and the Ford Aerospace 4,096×4,096 pixel element array, can be adapted to the present invention by subdividing the arrays in column groups and providing the circuitry for faster frame rates. Information useful for designing high pixel count area arrays also is found in J. Janesick, *Multi-Pinned-Phase Charge-Coupled Device*, NASA Tech. Brief Vol. 14, No. 8, Item No. 115, p. 22, Jet Propulsion Laboratory, August, 1990.

A two-dimensional area array type detector array can convert an entire image of a scene into a complete frame of pixel information during a short exposure period. After the exposure period, a shutter can be used to prevent continued exposure while the pixel information in the array is read-out to a signal processing unit. After the read-out is completed, the array is ready for the next frame exposure. If the frame read-out time is short (say, less than a second), then consecutive frames can be taken in sub-second intervals in order to obtain large scene coverage in short periods of time. By providing motion compensation in an area detector having exposure time controlled by a shutter, the present invention substantially reduces exposure of an aircraft, a pilot and a detector array to enemy countermeasures.

Mechanically-based forward motion compensation schemes have been devised and implemented in an attempt to eliminate image smear due to forward motion, or to reduce such smear to acceptable levels. Such schemes have been implemented by use of a translating film, a translating lens, or a rotating mirror.

In the translating film technique, the film is moved in the same direction and velocity as a portion of an image. The image motion velocity and the film velocity are made essentially synchronous and relative motion between them during the exposure time period essentially is eliminated. The net result is that the image portion is essentially stationary with respect to the film during the exposure time period. The translating film technique is frequently used on short and medium focal length framing type cameras.

In the translating lens technique, if a lens is translated in space, the image of distant objects will translate with the lens in a one-to-one relationship in the same direction. Therefore, if the lens in an aerial reconnaissance camera is translated at the proper velocity opposite to the direction of flight, the image velocity caused by the aircraft forward motion is cancelled by the image velocity due to the moving lens. The net result is that the image is essentially stationary relative to the film, and therefore no essential motion smearing is occurring during the exposure. This type of forward motion compensation is frequently used on short and medium focal length panoramic type scanning cameras. See,
e.g., Ruck, *Design Versatility of the Prism Panoramic Camera: The KS-116 and KA-95 Cameras*, SPIE Proceedings, Vol. 309, paper 309–10, (Aug. 27–28, 1981).

In the rotating mirror technique, as the aircraft is flying in a given flight path, the objects in the scene have an apparent angular velocity relative to the camera. The apparent angular velocity is related to the aircraft velocity and the range to the target. If a camera is looking into a mirror at a nominal angle of 45°, the camera line of sight is deviated by a nominal 90° angle. If the mirror is rotated in the proper direction and at the proper rate during the exposure, the scene appears to have no motion relative to the camera. Therefore, at the film plane, the image is essentially stationary and forward motion image smear is substantially negated. The rotating mirror forward motion compensation concept is often used on long focal length frame and line scanning type cameras.

All three of the foregoing mechanical forward motion compensation schemes are employed in various aerial reconnaissance cameras, including film cameras and electro-optical line scanning cameras. A principal disadvantage of these forward motion compensation schemes is that they all involve mechanical devices and consequently add complexity, weight, and expense to the imaging system.

Other methods and techniques of forward motion compensation also have been developed and are discussed in the Prinz patent, U.S. Pat. No. 4,505,559, the Gordon et al. patent, U.S. Pat. No. 4,157,218, and the Wight patent, U.S. Pat. No. 4,908,705.

These mechanical image motion compensation systems typically have no built-in capacity to automatically compensate for scene topography variations (i.e., variation in terrain). In the past, scene variation was typically compensated for by a human camera operator making manual adjustments to the camera controls, based on seat-of-the-pants estimates as to the relative differences in terrain, and by overriding the aircraft's true height above ground with an approximated higher or lesser value, depending on whether the particular scene target was higher or lower in elevation than the terrain directly below the aircraft. This state of affairs plainly leaves much to be desired in terms of providing a reconnaissance camera capable of accurate motion compensation due to terrain variation. The manual approach is entirely dependent upon the skill and luck of the camera operator, and the accuracy of the calibration of the camera control unit.

The Lareau et al. patent, U.S. Pat. No. 5,155,597, assigned to the assignee of the present invention, discloses an electro-optical imaging array which accomplishes forward motion compensation electronically, and without moving parts. In the Lareau et al. patent, the imaging array is composed of photosensitive cells arranged in rows and columns. The columns are organized in column groups. Each column group is given its own pixel information transfer rate. Pixel information in each of the column groups is transferred through the array at a rate in synchronism with the image motion rate in each column group. In the Lareau et al. patent, the pixel information is transferred through the array at a rate which closely approximates the actual image velocities when the terrain that is below and to the side of the aircraft is essentially flat (i.e., topographical variations are minimal in relation to the height of the aircraft above the scene).

Referring now to FIG. 1, the array 32 of the Lareau patent is shown displaced from the reconnaissance aircraft 22 in order to illustrate the technique of transferring pixel information in column groups at discrete transfer rates. The terrain imaged by the array 32 is bounded by points A, B, C and D, and points A', B', C', and D' in array 32 image the corresponding terrain. Terrain along line AB is closer to the aircraft 22, so a faster charge transfer rate (represented by the longer arrow) is given to the column group imaging the corresponding terrain. Similarly, terrain adjacent line CD is farther away, and the image velocities along line C'D' of the array 32 are slower, requiring a slower charge transfer rate, represented by the shorter arrow.

The present invention represents an improvement to the invention of the Lareau et al. patent, and provides an electro-optical imaging array with specifically compensates for terrain variation, to insure that the pixel information transfer rate closely matches the actual image velocities for each of the column groups, regardless of how the terrain may vary in the various sectors of the scene. Moreover, the present invention permits the control circuitry for the imaging array to continually update the pixel information transfer rates as the scene changes for successive exposures of the array.

The motion compensation techniques of the present invention also enables effective use of a detector array having a large number of photosites or pixels (e.g., four to six thousand or more in both the columns and rows of the array) that will image a large area of terrain in every frame. The present invention makes such arrays practical by preserving image resolution (i.e., scene detail information) in every frame of imagery, even where the terrain of interest is varied. The present invention also enables high array exposure sensitivity. That is, motion compensation is accomplished in a way that promotes long exposure time without blurring the image. In a pushbroom system, exposure time is limited by the line rate, which is dictated by the aircraft velocity to height ratio (V/H). For the present invention, the exposure time is not limited by the aircraft V/H ratio. This permits operation at lower scene illumination levels and extends the available time of day for light-sensitive sensor operation.

Additionally, the present invention provides for rapid read-out of collected scene information. A rapid read-out of the electrical signals of an array is necessary in order to achieve high frame rates. High frame rates are desirable to allow multiple images to be recorded in a short time such as required for stereo imagery.

The present invention offers additional advantages over linear electro-optical sensors. For example, profiled forward motion compensation is provided irrespective of whether the electro-optical imaging array is deployed in a side oblique or a down-looking application. The present invention also provides lower scene distortion and true stereo imagery capability. By using the present invention to replace a film camera mounted in an aircraft, motion compensation can be accomplished while retaining similar exposure times and aircraft maneuverability characteristics.

The present invention is reliable and robust because it requires no mechanical scanning mechanism, no rotating mirrors and no translating lenses in order to achieve forward motion compensation. Moreover, terrain variation is quickly and correctly compensated for by electronic means, and does not depend on a human operator's rough estimates of altitude or topographical variation to produce clear images.

Another feature of the invention is that it is suitable for use in a wide variety of applications, such as tactical reconnaissance, drug interdiction, low intensity conflict, low and medium altitude missions, and reconnaissance at low light levels.

Yet another feature of the invention is that the range from the aircraft to the scene of interest can be passively determined, that is, by simply exposing the array to the scene and processing the scene information according to the techniques described herein. There is no necessity for active range finding components (e.g., radar or laser) to determine range. This instant passive rangefinding capability provides increased security for the reconnaissance mission, as active rangefinding techniques may be detected from the ground, triggering a hostile response.

SUMMARY OF THE INVENTION

These and other objects, advantages, and features of the invention can be achieved in a system comprising an array of cells arranged in rows and columns for generating pixel information representing a scene. Generally, the columns of the array are arranged in column groups and the charge is transferred in each column group at different transfer rates. In one principal aspect, the invention is a method for processing the pixel information which compensates for scene topography variation and comprises the steps of:

generating first and second images of the scene, the second image generated at a later point in time from the generation of the first image;

deriving from the first and second images the image velocity of the scene in the plane of the array of cells; and transferring the pixel information through the array at a rate substantially equal to the derived image velocity, whereby resolution of an image created from the pixels is preserved.

The step of deriving the image velocity of the scene from the first and second images, in the preferred embodiment of the invention, involves the step of performing a correlation of the first and second images to determine the distance a fixed point in the scene is displaced in the plane of the array of cells in the duration T between the first and second images. When multiple column groups are used in the array, a fixed point in each column group is used in the correlation process. Knowing the displacement and the time duration T between the successive images, a residual image velocity $U_s$ can be derived. By continually adjusting the charge transfer rates between successive images and forcing the residual image velocity $U_s$ to zero, the image transfer rate is synchronized with the true image velocity.

The step of correlating the first and second images may involve the computation of the Fourier spectrum of the first and second images, or may involve a different correlation routine.

The step of transferring pixel information preferably involves the calculation of pixel information transfer rates for each of the column groups from the derived image velocity for each column group, and transferring of pixel information in each of said column groups at the calculated pixel information transfer rate for each column group. In this way, each column group of the array has a customized pixel information transfer rate to match the terrain variations (and hence image velocities) that are present in the scene imaged by the various column groups.

BRIEF DESCRIPTION OF THE DRAWINGS

The preferred embodiment of the present invention will be described in conjunction with the accompanying drawings, in which:

FIG. 1 is a schematic drawing of an aerial reconnaissance vehicle carrying an area array camera flying over the earth's surface, with the array greatly enlarged and displaced in order to show the transfer of charge in column groups as described in the prior art Larareau et al. patent, U.S. Pat. No. 5,155,597;

DESCRIPTION OF THE PREFERRED AND ALTERNATIVE EMBODIMENTS OF THE INVENTION

I. General Discussion

Figure 2A:
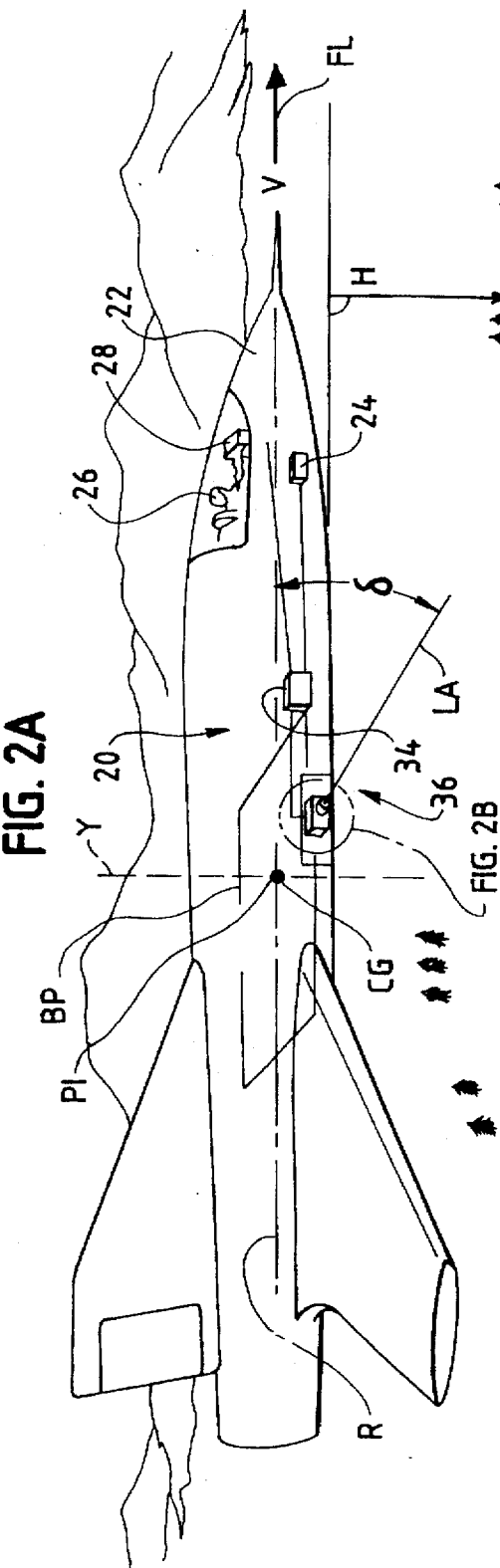
FIG. 2A is a simplified schematic drawing of an airborne reconnaissance system utilizing an electro-optical camera assembly made according to a preferred form of the present invention and showing the interrelationship between the system components.

Referring to FIG. 2A, a preferred form of the invention is implemented in a reconnaissance system 20 installed in an aircraft 22 that defines orthogonal roll, pitch and yaw axes R, PI and Y, respectively, each passing through a center of gravity CG. The roll and pitch axes define a bilateral plane BP that is horizontal during level flight. System 20 includes a camera assembly 36 defining a lens axis LA that can be directed toward a scene of interest.

Aircraft 22 has an avionics system 24 which provides to system 20 input signals indicating aircraft ground velocity (V), aircraft height above ground (H), and aircraft roll, pitch and yaw angular position data. From console 28, an operator 26 provides additional inputs into system 20, such as the depression angle δ between axis LA and plane BP. The inputs from the avionics system 24 and console 28 are fed to a camera control computer 34 which processes the inputs, together with pre-flight programmed information, and generates control signals for camera assembly 36.

Figure 2B:
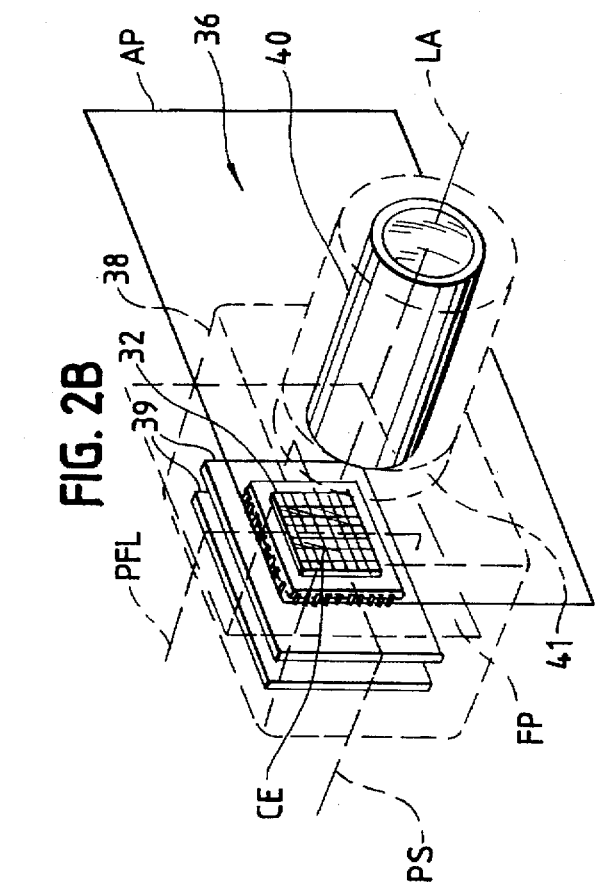
FIG. 2B is an enlarged, fragmentary perspective drawing of the camera assembly of FIG. 2A showing the relationship between various components, including an electro-optical imaging array.

Referring to FIG. 2B, camera assembly 36 includes an imaging array 32 defining a focal plane FP having a center point CE. Camera assembly 36 also includes a housing 38 and a lens 40 having a focal length F (not shown in FIG. 2B) and defining axis LA that passes through point CE. Aperture plane AP passes through the aperture of lens 40 perpendicular to axis LA. A shutter 41 is provided to selectively expose array 32 to radiation from the scene. Typically, housing 38 is isolated from the aircraft 22 in order to reduce vibration or other high frequency, low-amplitude motions. Printed circuit cards 39 incorporate the electronics that support operation of array 32.

Figure 3:
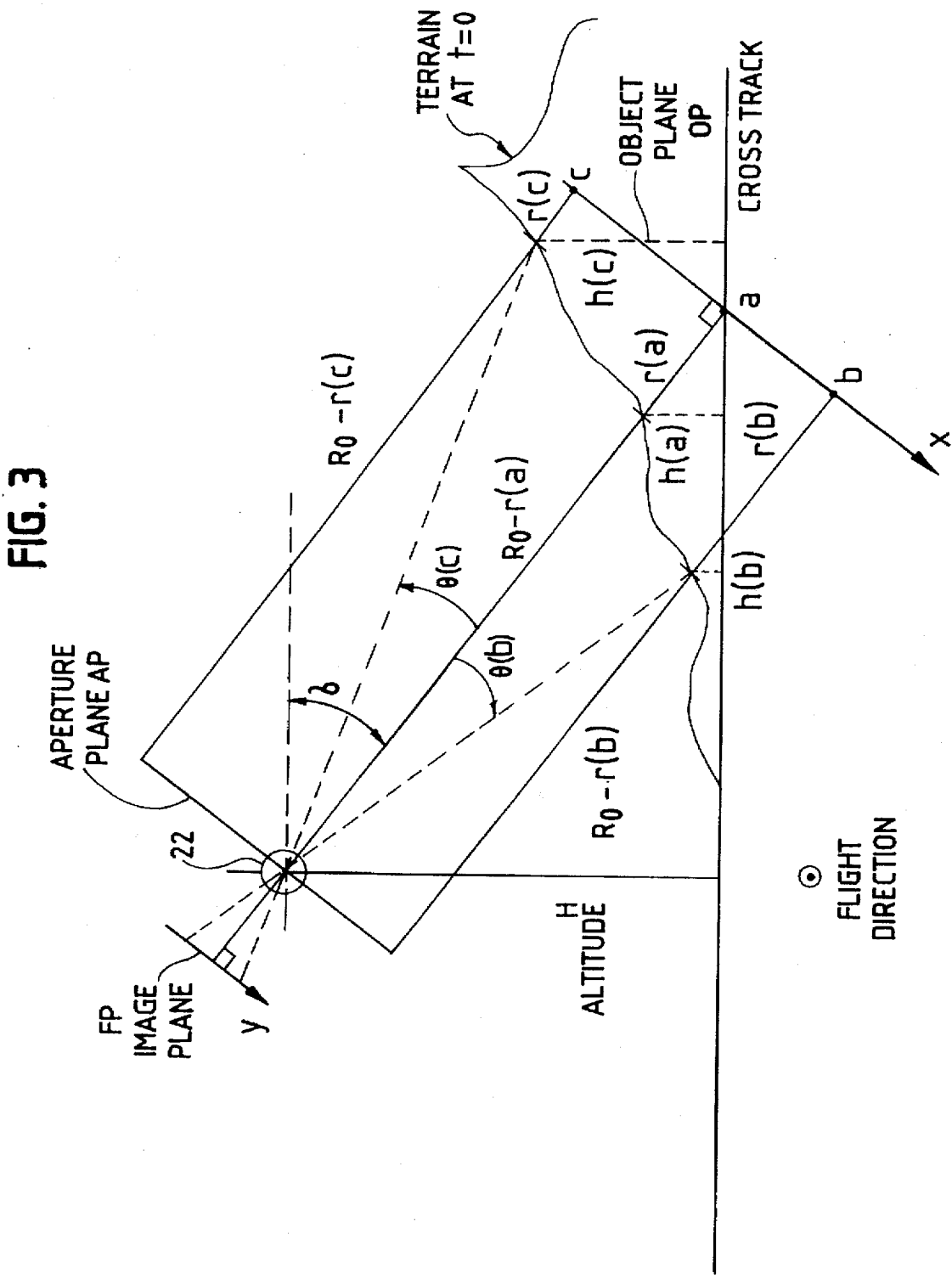
FIG. 3 is a schematic drawing of an aerial reconnaissance vehicle flying over the earth's surface in which a camera is taking pictures in a side oblique orientation in which the scene contains terrain variations showing the geometrical relationship between the terrain and the imaging array.
Figure 4:
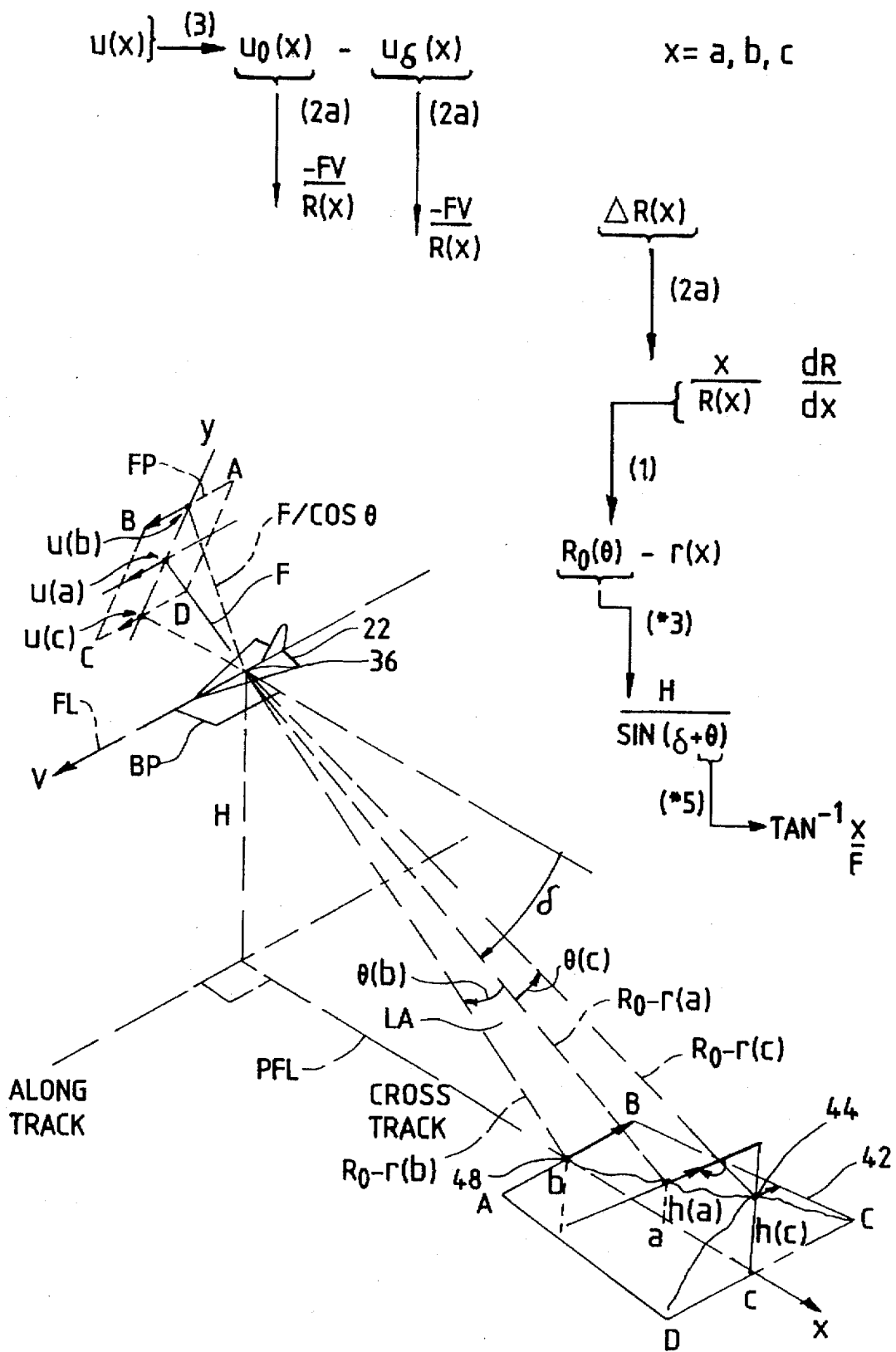
FIG. 4 is a schematic drawing of the reconnaissance aircraft and terrain of FIG. 3 from an oblique perspective, illustrating the focal plane of the camera assembly of FIG. 2B greatly enlarged and displaced in order to clearly show the relationship between the focal plane and a scene of interest, and the variations in image motion due to the terrain variations.
Figure 5:
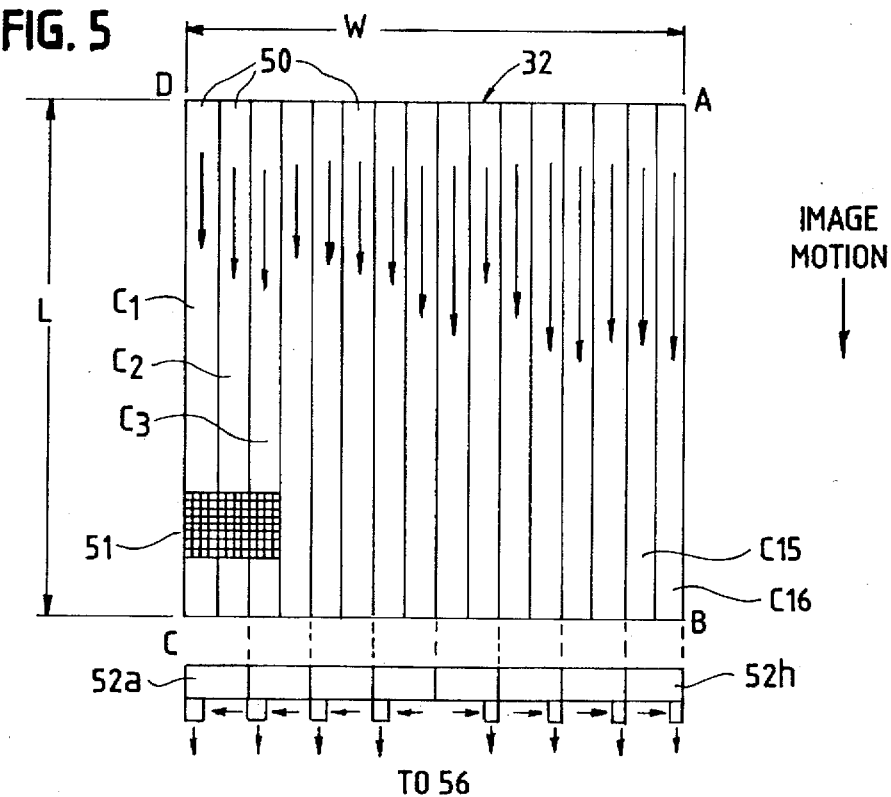
FIG. 5 is a schematic drawing of the imaging array of FIG. 2B showing the arrangement of the array in rows and columns, the organization of the columns into a plurality of column groups and the transfer of pixel information in each group at different predetermined and distinct transfer rates due to the variations in scene terrain.

FIG. 3 is a schematic drawing of the aircraft 22 flying over the earth's surface in which a camera is installed in aircraft 22 and is taking pictures in a side oblique orientation. The scene of interest on the earth's surface is subject to terrain variations, resulting in different ranges from the imaging array to the terrain, and hence different image velocities in the focal plane of the array. $R_0$ is the distance from the aperture plane AP to the object plane OP. The terrain has a profile resulting in height variations h(x) relative to altitude H, resulting in range variations r(x), where $R_0$–r(x) is the range from the aperture plane AP to the terrain. FIG. 4 is a schematic drawing of the reconnaissance aircraft and terrain of FIG. 3 from an oblique perspective, illustrating the focal plane of the camera assembly of FIG. 2B greatly enlarged and displaced in order to clearly show the relationship between the focal plane and the scene of interest, and the variations in image motion due to the terrain variations. FIG. 5 is a schematic illustration of the array 32.

FIGS. 3, 4 and 5 together illustrate a preferred technique of profiled forward motion compensation that is a principal feature of the present invention. FIGS. 3 and 4 show aircraft 22 carrying the camera assembly 36 operating in a side oblique mode, in which focal plane FP of imaging array 32 is oriented parallel to a line of flight vector FL coincident with roll axis R that defines the direction of motion of aircraft 22 and array 32. Referring to FIGS. 2B and 4, focal plane FP defines a plane PFL that is collinear with axis LA, passes through center point CE and is perpendicular to plane FP and vector FL. Focal plane FP also defines another plane PS that is collinear with axis LA, passes through center point CE and is perpendicular to planes FP and PFL and parallel to vector FL. Aircraft 22 flies over the terrain at velocity V and at height H. In order to image a scene 42, lens axis LA and plane PS of array 32 (FIG. 2B) are oriented at depression angle δ with respect to plane BP (FIG. 4).

Lens 40 focuses scene 42 onto imaging array 32, which is placed at the focal plane FP of the lens. The boundary of the scene 42 is defined by points A–D, and the corresponding points in plane FP in FIG. 4 are shown with like letters. The rate of image motion is not constant throughout the array, but rather is dependent upon the range between lens 40 and the points of the scene lying in plane PFL. The greater the range, the slower the rate of image motion in focal plane FP of the lens.

When the scene is subject to substantial terrain variations, as shown in FIGS. 3 and 4, the ranges vary, and it is desirable to provide image motion compensation in the array that is specific to the actual profile of the scene terrain during the exposure period. When the terrain is flat, the ranges can be approximated, as discussed in the Lareau et al. patent referenced previously.

To compensate for the fact that the image motion varies down and across the array due to the side oblique orientation of the camera, and due to the terrain variations in the scene, the preferred form of the present invention implements a "profiled" forward motion compensation technique that is specific to the terrain profile, whereby array 32 is organized into a plurality of column and row groups. Charge is transferred only down the columns (from pixel to adjacent pixel) in all the columns of the column groups in the direction of image motion during the time period of scene exposure. The charge transfer rate in each column group is determined such that it closely matches the image velocity (and, hence, terrain profile) of that column group. The rate of charge transfer is made variable in the direction transverse to the image motion, i.e., across the column groups of array 32. Thus, by synchronizing the charge transfer velocity and the image motion velocity in discrete steps across the array, profiled forward motion compensation is achieved electronically with no moving parts. Ideally, each column of pixels would have its own column transfer rate. However, for many applications, it is sufficient to organize the array into a discrete number of column groups and to transfer charge at a uniform rate in all the columns of an individual column group.

Referring to FIG. 5, the boundary of the image of scene 42 on array 32 is indicated by points A–D which correspond to the like lettered points of scene 42 (FIG. 4). Width W of array 32 preferably is 48 to 60 mm and represents 4000 to 6000 pixels. Length L of array 32 preferably is 48 to 60 mm and represents 4000 to 6000 pixels. Only a few of the pixels 51 are shown schematically in FIG. 5. The pixels of array 32 are divided into rows and columns, and the columns, in turn, are organized into a plurality of column groups 50. The number of column groups selected may vary depending on the operational parameters of the system, the degree of resolution required, and the desired cost to performance ratio. It has been found that 16 column groups provide a very high level of forward motion compensation for array 32 and are an acceptable number of groups in an array having approximately 5,000 individual columns.

Still referring to FIG. 5, each column group 50 has its own separate variable (and adjustable) charge transfer rate (generally measured in pixels/second) which is adjusted between successive frames to the estimated image motion rate. As discussed below, sequential images from a portion of the column group are used to derive the charge transfer rate. The portion of the column group that is used by the signal processing circuitry to calculate the image velocity and hence charge transfer rate is arbitrary, i.e., the center of the column, or the left hand column in each column group can be chosen. The variable charge transfer rates are represented as arrows, and the longer arrows represent faster rates. Referring to FIG. 5, and the example in FIG. 4, column group C16, which images the terrain closest to line AB (FIG. 4), has a relatively fast charge transfer rate, since line AB is closest to aircraft 22, and the image motion is relatively rapid in that portion of scene 42. Column group C15 is also given a relatively fast charge transfer rate, due to the closeness of the terrain imaged by that column group. If the terrain imaged in column group C15 happens to be substantially elevated relative to the terrain imaged in column group C16 (e.g., by the presence of tall trees, buildings or hills), the terrain may in fact be closer to the aircraft 22, requiring the charge transfer rate in column group C15 to be even faster than the charge transfer rate of C16. Column C1, which images terrain adjacent line CD (FIG. 3), has a relatively slow charge transfer rate, but if the terrain in that area happens to be significantly elevated, the charge transfer rate may be faster than that for the adjacent column group. As illustrated in FIG. 5, the charge transfer rates vary across the array depending on the particular scene topography during the exposure period. If the terrain is flat, the rates would vary monotonically across the array in a side-oblique orientation of the array.

It will be readily understood that the charge transfer rates shown in the example of FIG. 5 are unique to the particular terrain 42 imaged at one particular point in time. As the aircraft flies over the terrain and takes successive exposures, the terrain will of course vary. As discussed in detail below, the signal processing circuitry and camera control electronics are used to adjust the charge transfer rates between successive exposures to ensure that, during the exposure period, the charge transfer rates for each of the column groups are continually updated to closely match the image motion rates. It should be also understood that the process which estimates the charge transfer rates is itself greatly assisted by the nominal charge transfer rate in effect during the successive exposure periods.

In the preferred embodiment of our invention, we have also taken into account the fact that the range from the array 32 to the terrain varies not only across the array (in the direction AD and BC of FIG. 4), but may also vary along the direction of the columns (in the direction DC and AB). As discussed in detail below, the signal processing circuitry for the array may sample the image velocity in several (e.g., 8) regions in the column direction in each column group. By calculating the image velocities in the several samples along the length of the column in each column group and comparing the results, a particular charge transfer rate can be intelligently selected for the column group. This selected transfer rate can, for example, be the average of the image velocities, or the image velocity that occurs with the greatest frequency of the sampled image velocities.

Referring again to FIG. 5, during the exposure time period when shutter 41 is open, charge representing scene information is collected in pixels in array 32 and is transferred from one adjacent pixel to another according to the selected charge transfer rates in the column groups. When the exposure time period ends (i.e., when shutter 41 is closed), the accumulated charge representing the scene is sequentially read out of array 32 one row at a time into readout registers 52A–52H. From readout registers 52A–52H, the information is fed to the signal processing circuitry, where calculation of charge transfer rates for the next exposure takes place. When the readout is complete, array 32 is ready for the next scene exposure. At this point, and as discussed in detail below, the charge transfer rates for each of the column groups are updated depending on new inputs, such as aircraft velocity, height, camera depression angle, and whether the terrain variation has changed between the successive exposures, and, if so, to what extent. In this manner, the charge transfer rates are continually adjusted between successive frames to match the charge transfer rates in the several column groups with the image motion rates in the column group.

Figure 6:
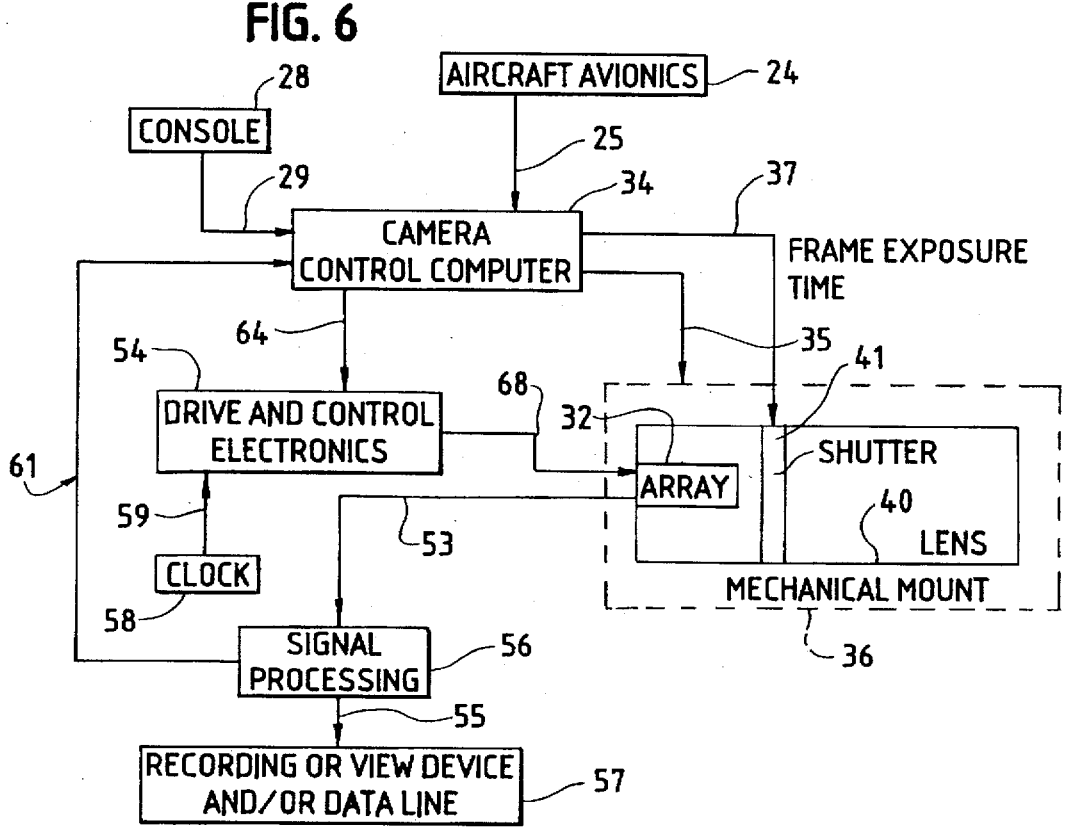
FIG. 6 is a block diagram of a preferred form of electronics and control circuitry that operates the electro-optical imaging army of FIG. 2B according to the teachings of the present invention.

Referring to FIG. 6, the camera assembly 36 and its associated control circuitry are illustrated in block diagram form. Avionics system 24 provides velocity and height information over a bus 25 as inputs to camera control computer 34. From console 28, the operator inputs into computer 34 over a bus 29 the depression angle δ in degrees (FIG. 2). Stored in computer 34 are mission parameters that are previously determined, e.g., focal length F of lens 40, the mode of operation (side oblique or forward oblique), the size of array 32, number of column groups, pixel size, and a control circuit master clock frequency (discussed below).

After processing the data inputs, computer 34 transmits signals over a bus 35 that enable lens axis LA of camera 36 to be directed to the desired orientation, transmits signals over a bus 37 that controls the frame exposure time period by enabling opening and closing of shutter 41, and transmits command signals over a bus 64 to the drive and control electronics 54. Drive and control electronics 54 transmits signals over a bus 68 that organizes the columns of array 32 into one or more groups and that transfer pixel information located in the one or more groups at one or more predetermined transfer rates. A master clock 58 issues pulses over a conductor 59 at a predetermined master clock frequency to drive and control electronics 54. Alternatively, the master clock pulses may be supplied by computer 34.

Scene information in imaging array 32 is fed over a bus 53 to a signal processing unit 56 which, in turn, sends the information over a bus 55 to a recording or viewing device 57, or to a data link for transmission to a remote location. Signal processing unit 56 also provides exposure control feedback to computer 34 over a bus 61 so that the frame exposure time may be adjusted to optimize signal collection. As discussed below, signal processing unit 56 is used in the correlation process to determine the distance a fixed point in the scene has translated, which is part of the process of determining the updated charge transfer rates. Computer 34, together with the signal processing circuitry 56 functions as a means for estimating and adjusting the transfer rates depending on the velocity of the aircraft, the height above the terrain, the depression angle, the terrain variations, and possibly other parameters.

Figure 7:
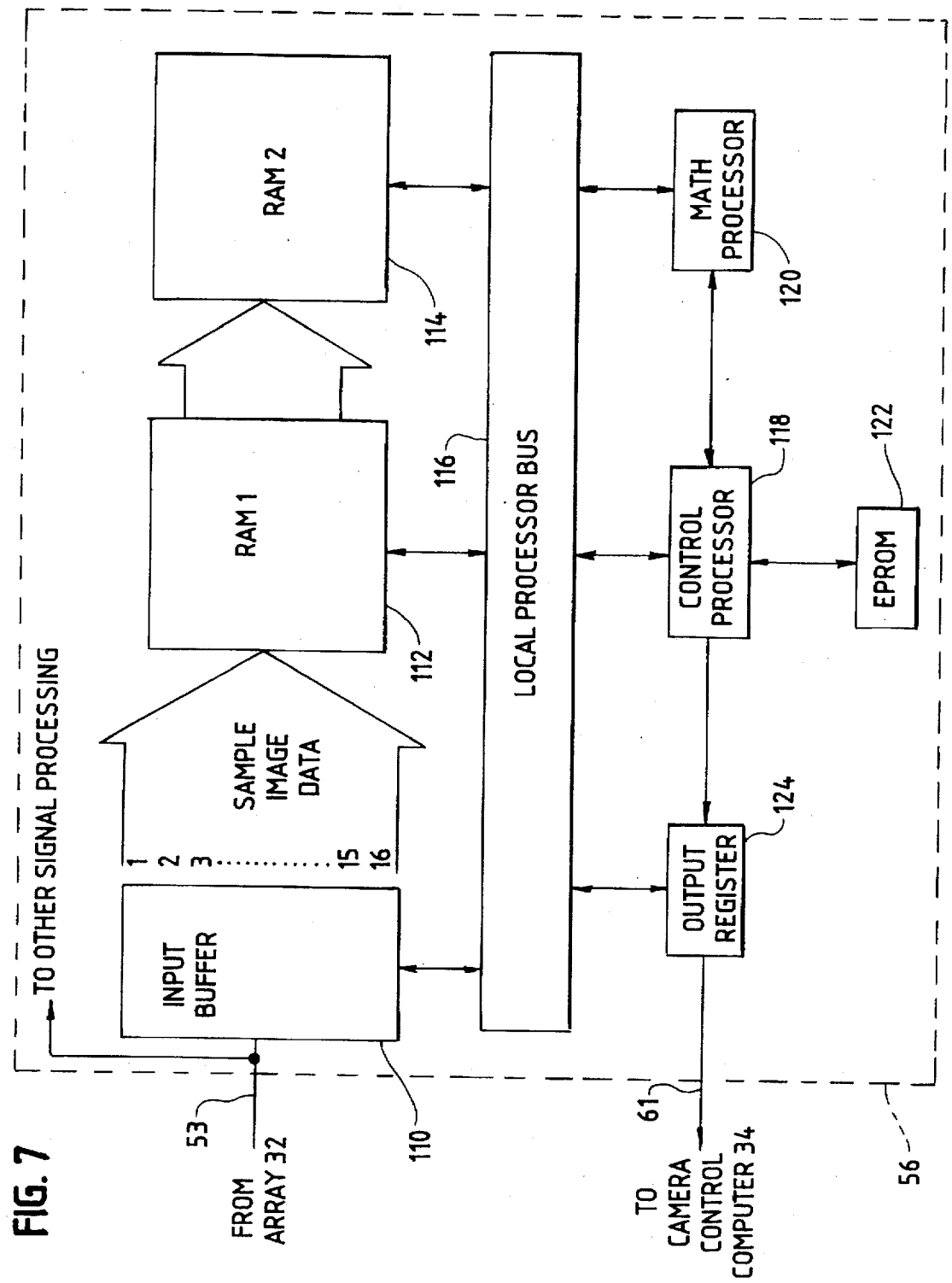
FIG. 7 is a detailed block diagram of the signal processing unit of FIG. 6.

Referring to FIG. 7, the signal processing unit 56 of FIG. 6 is shown in greater detail. Pixel information from sequential images from the imaging array 32 is converted to digital form and fed along bus 53 to an input buffer 110. Sampled image data from the first image from the 16 column groups is than fed to a RAM memory unit 112. Sampled image data from the second image from all 16 column groups is fed to a second RAM memory unit 114. The memory units 112, 114 could, of course, comprise a single memory unit; two are shown for purposes of illustrating the correlation process between the two sequential images. A local processor bus 116 passes commands from and between the various modules of the signal processing unit 56.

Figure 8:
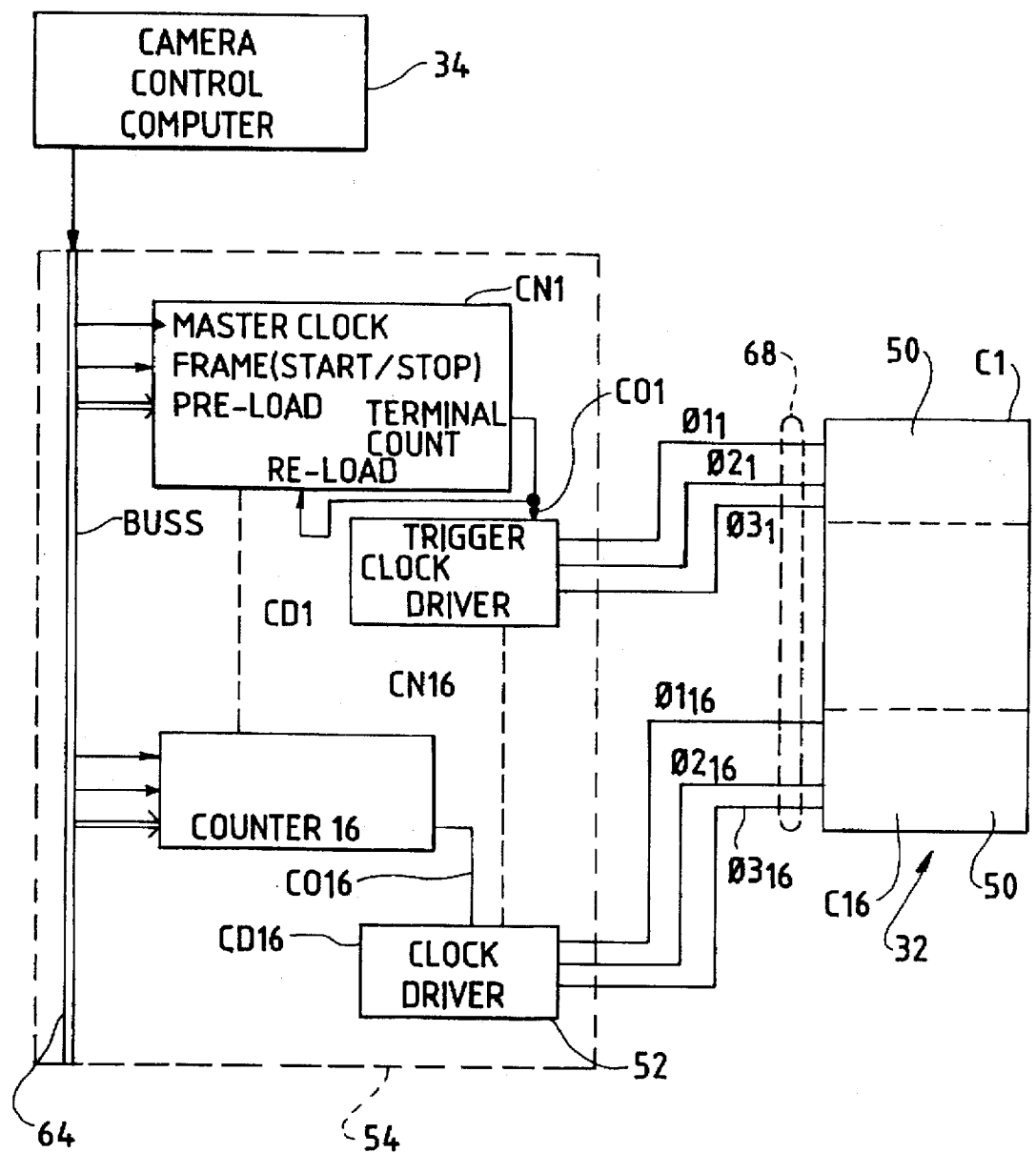
FIG. 8 is a block diagram of the drive and control circuitry shown in FIG. 5, illustrating the counter and clock drivers which transfer pixel information in each of the column groups of the imaging array shown in FIG. 5.

The signal processing unit includes a control processor 118, a math coprocessor 120, an EPROM 122 and an output register 124. The control processor 118 supervises the performance of the correlation algorithms that are described in detail below in the section entitled Signal Processing of Successive Images to Determine Pixel Information Transfer Rates. The math processor 120 performs the computationally intensive calculations. The EPROM stores the software that contains the correlation algorithm. After the control processor 118 has performed the correlation processing between the successive images for all 16 column groups, digital signals representative of updated charge transfer rates for all 16 column groups are fed to the output register 124, which in turn passes the signals along conductor 61 to the camera control computer 34. The camera control computer 34 issues commands to the drive and control electronics module 54 to control the transfer of charge through the array 32. Referring to FIG. 8, drive and control electronics 54 is shown in greater detail and illustrates the alternative embodiment in which master clock pulses are provided by computer 34, instead of from an external clock. For column groups C1–C16 of array 32, counters CN1–CN16 and corresponding clock drivers CD1–CD16 are provided. The outputs of counters CN1–CN16 are connected to the inputs of clock drivers CD1–CD16 by conductors CO1–CO16, respectively. Representative counter CN1 for column group C1 receives inputs over computer data bus 64, including pulses from a master clock located inside computer 34, a frame start/stop signal, and a pre-load signal representing a counter value which is related to the charge transfer rate for column group C1. When counter CN1 counts to the counter value, a trigger signal is sent by the counter to clock driver CD1 over conductor C01. Clock driver CD1, in response to the trigger signal, transfers pixel information in all the columns in column group C1 by one row in array 32 by issuing voltage pulses over 3-phase output bus 68. This process of counting to a counter value and triggering a clock driver may repeat any number of times during the scene exposure depending on the rate of image motion in plane FP of array 32 (FIG. 2B). The faster the rate of image motion in the plane of the array, the more times the counting and triggering cycle must be repeated in order to synchronize the image motion with the charge motion in the array 32.

Still referring to FIG. 8, signals from camera control computer 34 travel via data bus 64 to each of the counters CN1–CN16 for each of column groups C1–C16. Each of clock drivers CD1–CD16 provides one set of 3-phase clocking output lines $\emptyset_1$, $\emptyset_2$ and $\emptyset_3$ per column group. In FIG. 8, the subscript of a clocking output line identifies the corresponding column group within column groups C1–C16.

Figure 9:
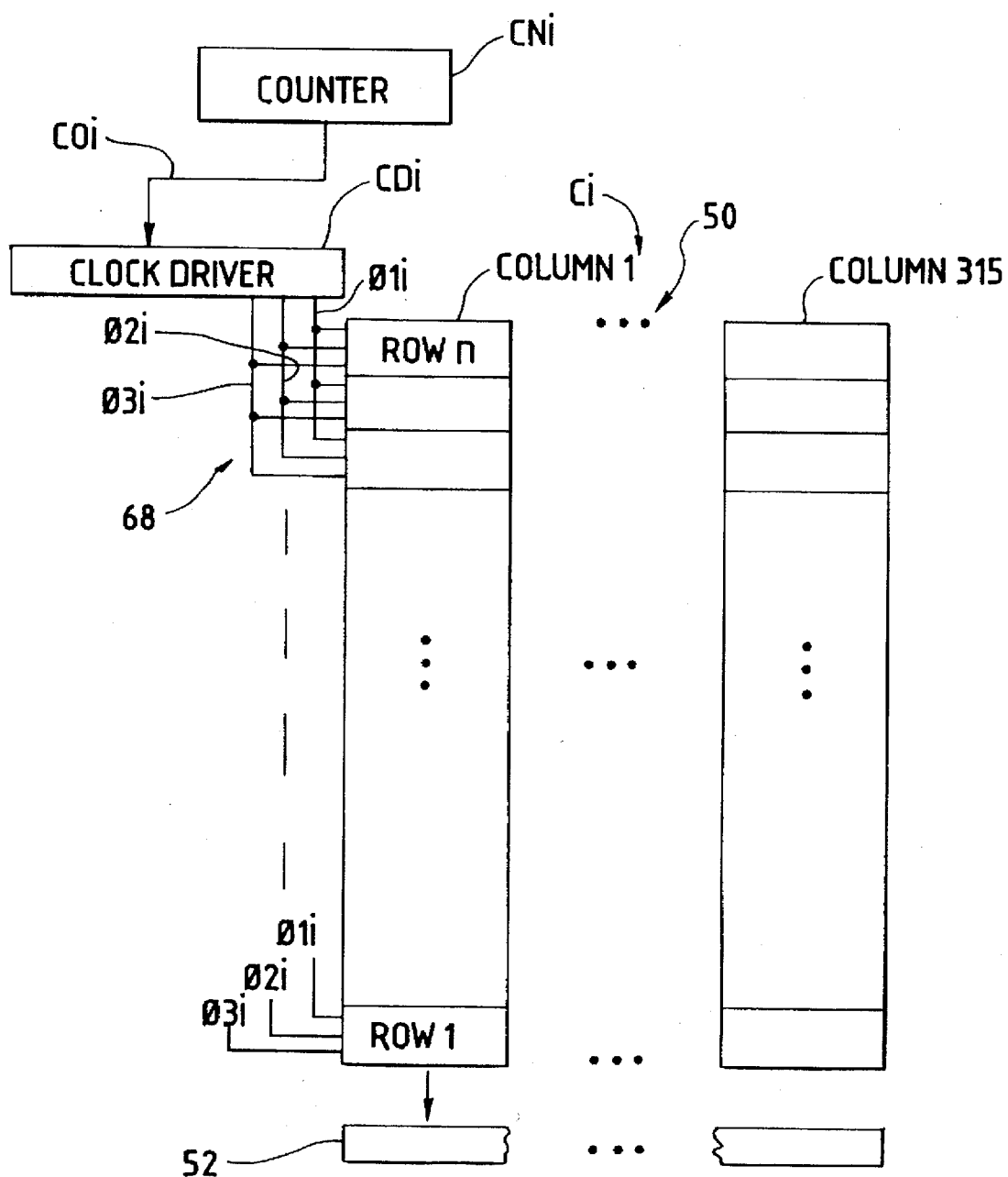
FIG. 9 is a schematic, block diagram of a counter and clock driver for an arbitrary column group of the imaging array of FIG. 5.

FIG. 9 shows a typical arbitrary column group Ci (50) and its associated counter CNi and clock driver CDi. For purposes of illustration, column group Ci is composed of 315 individual columns. In order to ensure that all array rows in a column group are transferred simultaneously when a related counter triggers a corresponding clock driver, the 3-phase clocking must be provided to all rows of the column group. This is shown symbolically by the 3-phase output lines 68 of clock driver CNi extending the length of column group Ci so that each row of column group Ci receives the 3-phase clocking pulses.

Assuming the clock drive circuits are not fabricated on the imaging array, 3-phase output bus lines 68 must be bonded to separate package pins for external drive control. Thus, the number of vertical clock drive pins for array 32 is three times the number of column groups.

Figure 10:
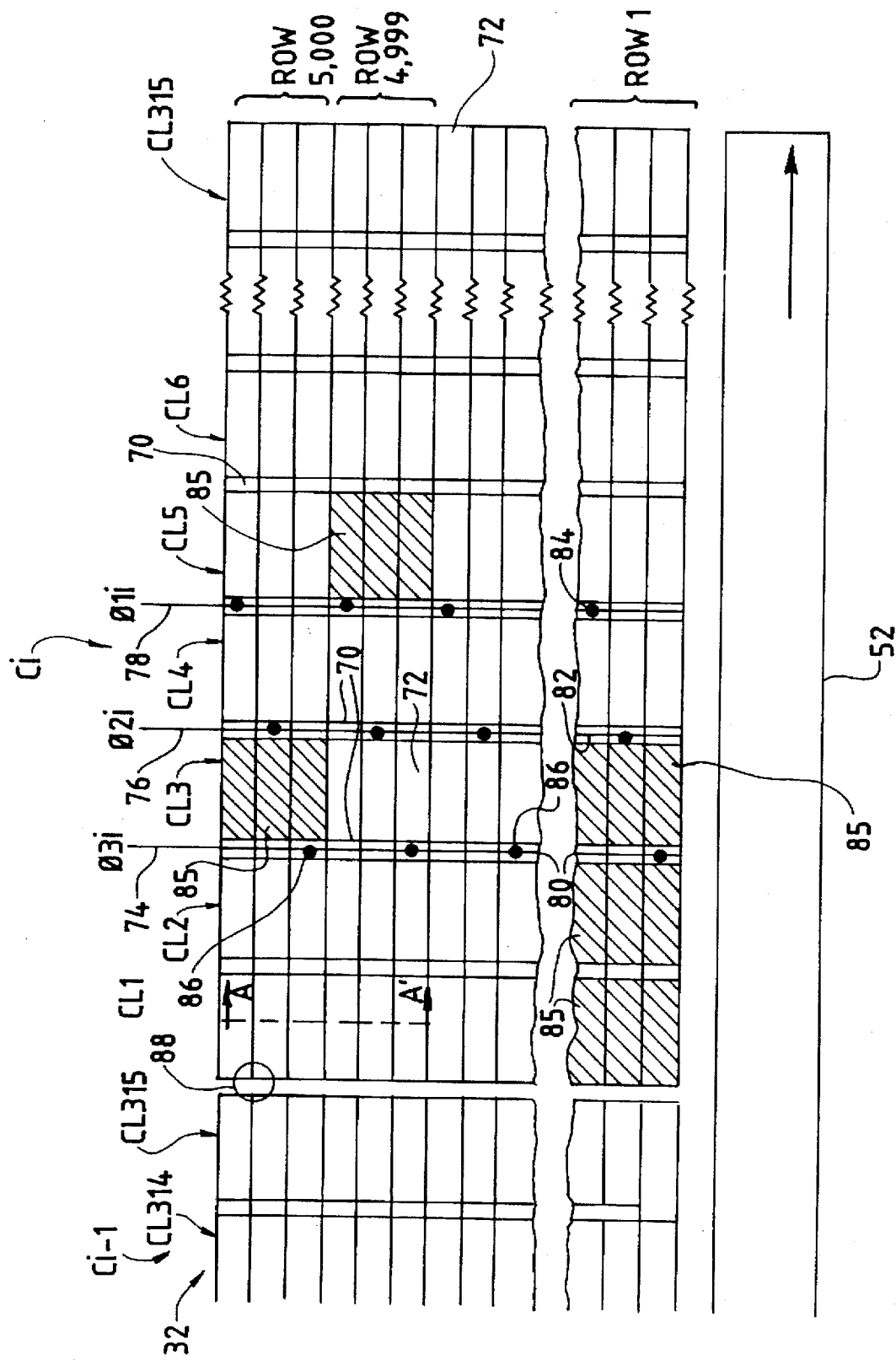
FIG. 10 is a schematic drawing of one section of an arbitrary column group showing the metalization on top of the channel stop region between photosites of the array to provide the three-phase drive clocking to the column group.

FIG. 10 shows in enlarged detail one portion of an arbitrary column group Ci of imaging array 32. In particular, part of column group Ci is shown adjacent to the extreme lateral part of a neighboring column group Ci-1. Column group Ci is composed of 5,000 rows of photosites 85 and 315 columns designated CL1–CL315. Each photosite (shaded region) is bounded by a p+ channel stop 70, which separates each column from the next. Polysilicon horizontal lines 72 subdivide the photosite and bus the 3-phase clocking signals across the column group. The vertical clock drive pins 74, 76 and 78 are connected to metalization lines 80, 82 and 84, which run the entire length of the column group.

Metal to polysilicon contacts 86 on top of the channel stop regions 70 are provided periodically every third horizontal line throughout the length of the column group for each metalization line to provide the voltage pulses for each row of the array. The 3-phase clocking signals (voltage pulses) may confine individual photosite charge vertically or may provide for the vertical transfer of these charge packets. Column groups Ci and Ci-1 are separated from each other by providing a break 88 in the polysilicon horizontal lines 72.

Figure 11:
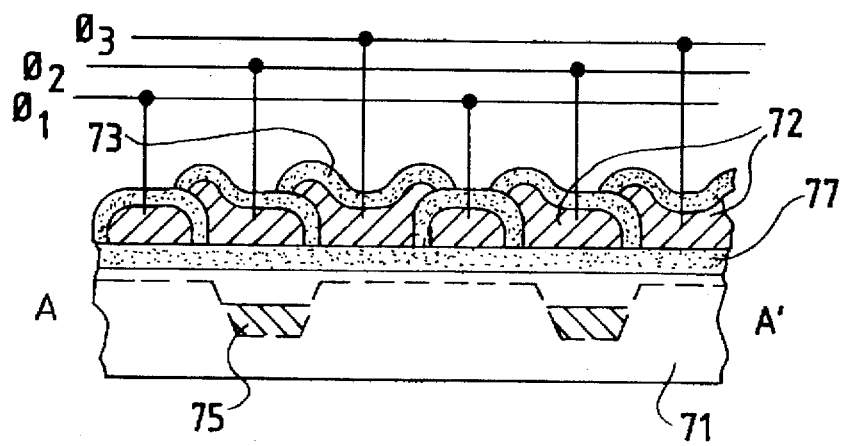
FIG. 11 is a cross-sectional view of one section of the column group along line A—A of FIG. 10.

FIG. 11 is a simplified cross-sectional view of the array of FIG. 10 along the line AA'. The polysilicon horizontal lines 72 are pulsed by the 3-phase clocks $\emptyset_1$, $\emptyset_2$, $\emptyset_3$, causing charge packets collected in potential wells 75 in a p-type silicon substrate 71 to be shifted down the array. In FIG. 11, the polysilicon horizontal lines 72 are isolated from each other by a $SiO_2$ layer 73. Another $SiO_2$ layer 77 also separates the polysilicon horizontal lines 72 from substrate 71.

The charge-coupled device architecture shown in FIG. 10 is essentially a full frame imager configuration. The full frame configuration provides a large area array which provides a high percentage of silicon wafer area available for light collection. By contrast, a frame transfer architecture requires a frame storage region which occupies approximately the same amount of silicon wafer area as the imaging area. The interline transfer architecture is not as desirable since it does not provide the image resolution and small pixel pitch of the full frame design. The interline transfer architecture also requires a vertical transport register which adds non-sensitive spacing between adjacent pixels, reducing fill-factor and resolution. An X-Y addressable charge injection device is another possible architecture for the present invention. A discrete array of diode detector elements is also a possible architecture for the invention. Such an array or the above-mentioned architectures could operate in the ultraviolet, visible, or infrared spectral regions. Nevertheless, the teachings disclosed herein can be readily adapted to these architectures should they be preferred for other reasons, and the scope of the present invention is intended to cover these alternative architectures.

II. Signal Processing of Successive Images to Determine Pixel Information Transfer Rates FIG. 4 illustrates the geometrical relationship between the array 32, scene 42 and aircraft 22 when the scene is subject to terrain variation in the direction across the line of flight. The following relationship exists between stationary object points x moving image points y in the plane of the array:

$$y + Ut = -\frac{F}{R(x+Vt)}(x+Vt) \quad (1)$$

where F is the focal length of the lens 40 (FIG. 2B); the unknown range R as a function of x is given by $R(x)=R_0 - r(x)$, where $R_0$ is an estimate of the height of the camera above the earth, r(x) is the random terrain profile, V is the known sensor velocity; t is time and U is the image transfer velocity.

First, it is necessary to consider image scaling. At any moment in time, the relationship between the object length $\Delta x$ and image length $\Delta y$ can be shown to be:

$$\Delta y = [U_o(x+Vt) - U_\delta(x+Vt)]\frac{\Delta x}{V} \quad (2a)$$

where $$U_o(x) \equiv -\frac{FV}{R(x)}$$

is the current image velocity estimate, $$U_\delta(x) \equiv -\frac{FV}{R(x)} \nabla R(x)$$

is the residual image velocity, and $$\nabla R(x) \equiv \frac{x}{R(x)} \frac{dR}{dx}$$

represents the "relative scope" of the terrain at x. Similarly, after a time $\Delta t$, this relationship is:

$$\Delta y = [U_o(x+Vt) - U_\delta(x+Vt) - U]\Delta t \quad (2b)$$

The objective of image motion control is to synchronize the image transfer velocity U with the true image velocity $U_o - U_\delta$:

$$U = U_o(x+Vt) - U_\delta(x+Vt) \quad (3)$$

Thus, when (3) is satisfied, the image can be integrated during the entire exposure without image smear. Regrettably, the optimal image transfer rate (3) is neither uniform (x-independent) nor steady (t-independent). Because the transfer counters and drivers (FIG. 8) are held to a fixed value throughout the entire column group and during the entire exposure, we must assume some nominal range $R_0$ during each picture event.

Clearly, terrain variations are less important when $|U_\delta| \ll 1$, i.e., when $|\nabla R|(x)| \ll 1$ or equivalently, only at those points so near the optic axis that $|x| \ll R(x)|dR/dx|^{-1}$. At these points, image scaling is so uniform that the terrain can be considered flat. However, even when this approximation holds, profiled forward motion compensation is important at long exposure times.

For example, for typical long range oblique photography, the field-of-view (FOV) is 2.5°, the range at center-FOV is 60 kft, the focal length is F=3 ft and the speed is V=480 knots≈810 ft/s. The furthest point in the FOV is x=±50 kft tan (½ 2.5°)=±1.3 kft. If $\Delta R$=8 kft over $\Delta x$=2 kft then $$|\nabla R(x)| \approx \frac{|x|}{R(x)} \frac{\Delta R}{\Delta x} = \frac{1.3}{60} \frac{8}{2} = 0.09 \ll 1.$$

Thus, while $$|U_\delta| = \frac{FV}{R} |\nabla R| = \frac{(3 \text{ ft})(810 \text{ ft/s})}{(60 \text{ kft})} (0.09) = .007 \text{ ft/s}$$

is small, the image smear introduced during a 20 ms exposure is 0.07 ft/s×20 ms×(1 line/10 μm)=4.3 lines which is quite significant. Of course, image smear only increases at shorter ranges and longer exposures.

A. Profiled FMC without along-track terrain variations

Let us assume that the terrain profile is constant in the along-track direction (but variable in the cross-track, i.e., across the line of flight direction). Now, if an initial estimate $R_0$ is known, then, using (2b) with $\nabla R$=0, we have $$U = U_0 - U_\delta \quad (4a)$$

where $$U_0 = \frac{-F}{R_0} V \quad (4b)$$

is the corresponding initial transfer velocity and $U_\delta$ is an estimate to the residual image velocity. A reasonable estimate of the residual velocity is $U_\delta$=d/T where d is the distance between a known point y in two successive images delayed by a time T. Denote the overlapping potions of these first and second successive images $g_1(y)$ and $g_2(y)$, each an N element sequence; their corresponding Fourier spectra are $G_1(k)$ and $G_2(k)$. Then either of the following estimators (correlation techniques) can be used to determine $U_\delta$ $$U_\delta = \frac{d}{T} = \frac{1}{T} \begin{cases} \left[ \sum_{y=1}^{N} g_1(y)g_2(y+d) \right] \text{max with respect to } d & (4c-1) \\ \frac{1}{j2\pi k} \log \frac{G_1(k)}{G_2(k)} & (4c-2) \end{cases}$$

The results from (4a) and (4c) can be used to set the system's line transfer rate LTR and counter value CV given a known along-track pixel size P and master clock frequency X:

$$LTR = \frac{|U_0|}{P} \quad (*1)$$

$$CV = \text{round}\left( \frac{X}{|U_0|} - P \right).$$

The second estimator (involving the Fourier spectra) will, as a rule, perform better than the first estimator because: 1) multiple estimates of d are available at all k where the ratio is defined and 2) fewer operations are required.

Given N samples of size P in each of the two images, the accuracy to which the residual velocity can be estimated is $$\frac{\Delta U_\delta}{U_\delta} = \frac{\Delta d}{d} = \frac{P}{NP} = \frac{1}{N} \quad (*2)$$

Procedure (4a–c) is independently applied for each column group, i.e., at each cross-track field angle of interest.

The profiled forward motion compensation (FMC) procedure (4a–c) correctly deals with terrain variations if they are isolated to the cross-track direction. This is nonetheless a substantial improvement over graded FMC, which assumes a constant grade in both directions. Profiled FMC is not, however, fundamentally limited to cross-track terrain variations. In fact, we show below how profiled FMC can be used for random profiles in the line of flight direction so long as the terrain contains one (or more) piecewise flat regions.

Figure 12:
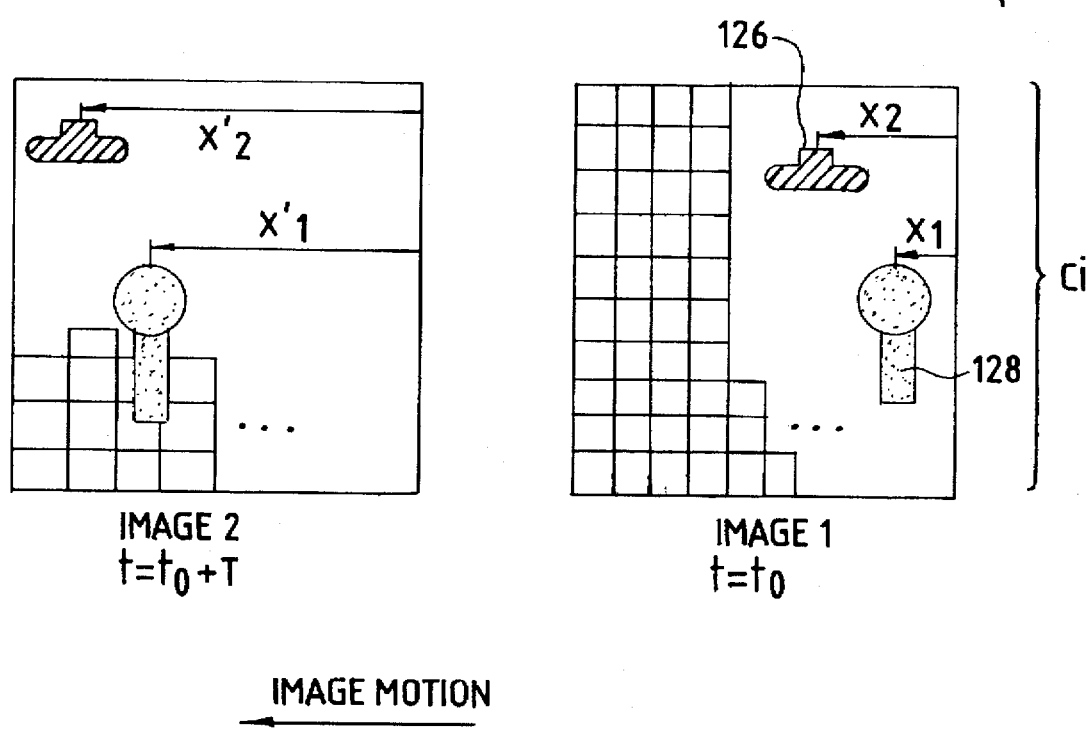
FIG. 12 is an illustration of two successive images from one of the column groups of the array of FIG. 4, showing the displacement of fixed points of the scene within the column group, the successive images being used to calculate the charge transfer rate for the column group for the subsequent image generated by the column group.

FIG. 12 illustrates a simplified example of the determination of charge transfer rate from successive images. FIG. 12 is an illustration of two successive images from one of the column groups of the array of FIG. 5. The image on the right represents a portion of an arbitrary column group $C_i$ at a time $t=t_0$. At this time, two portions of the image are represented by objects 126 and 128. For the purposes of this example, let object 128 be located a distance $x_1$ from the top of the column group $C_i$, and let object 126 be located a distance $x_2$ from the top of the column group. Let T equal the time that elapsed between the successive images. At time $t=t_0+T$, the objects have moved to their new positions, $x_1'$ and $x_2'$, respectively. The translation distance of object 128 is $d_1=x_1'-x_1$, and its velocity is $d_1/T$. The distance $d_1$ is determined by correlation of the images by performance of the computations set forth in equations (4c).

Figure 13:
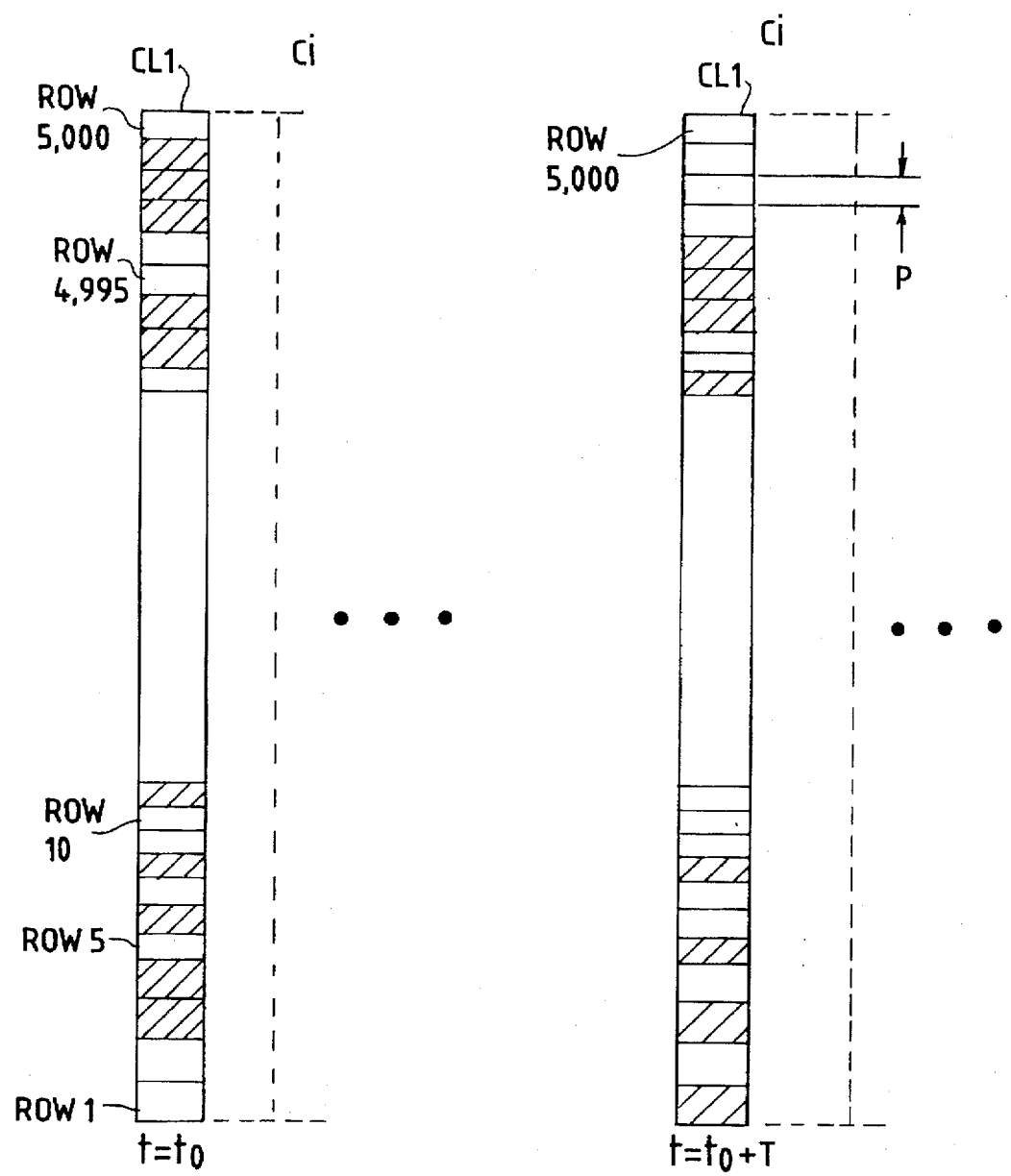
FIG. 13 is a schematic diagram of successive images from one column of an arbitrary column group, which are used to calculate the residual image velocity, translation distance of fixed points in the image, and ultimately an updated charge transfer rate for the column group.

The example of FIG. 12 shows the translation of several objects within one column group for the purposes of illustration, where the objects 126 and 128 are spread over more than one discrete column of pixels. In the preferred embodiment of the invention, only one column of pixel information (of length N pixels) is used for performing the correlation between the successive images. Referring to FIG. 13, a single column CL1 of an arbitrary column group $C_i$ containing pixel information is shown on the left at time $t_0$, and on the right at a later time $t_0+T$ when a successive image in generated. In the example of FIG. 13, pixel information, comprising variations in the electrical charge stored in the potential wells, is illustrated by the dark and light pixels. When the charges are read out of the array, the pixel information is converted to a digital signal and the overlapping portions of the images can be represented as functions $g_1(y)$ and $g_2(y)$, where the subscript of the function g represents the first or the second images. The image translation is represented in FIG. 13 by the translation of the patterns of light and dark pixels a distance of three pixels in the column direction. By correlating the first and successive images $g_1(y)$ and $g_2(y)$ and knowing in advance the pixel size and time lag T, the translation distance d and hence residual image velocity $U_\delta$=d/T can be calculated.

It should further be noted that, after the exposure of array 32 to the radiation from the scene, the image data from all the columns of the array 32 is serially fed into the input buffer 110 of the signal processing unit 56. Thus, the data from the column of the column groups 50 (FIG. 5) that are to be used in the correlation process can be freely chosen by the correlation routines. As noted earlier, the particular column of pixel information used in the correlation process could, for example, consist of the first column in each column group 50, the middle column in the column group 50, or any arbitrary column in the column group 50. Since the charge transfer rates are the same for all the columns in each column group, it may be desirable to use a column in the center of the column group to optimize the chances that the derived charge transfer rate closely matches the charge transfer rates in the other columns of the column group. It, of course, will be understood that the signal processing of the image, as illustrated for one column group $C_i$ in FIG. 13, is being performed in parallel with one column of data from all the other column groups such that updated charge transfer rates are being calculated for each of the column groups.

B. Profiled FMC With Along-Track Terrain Variations

Figure 14A:
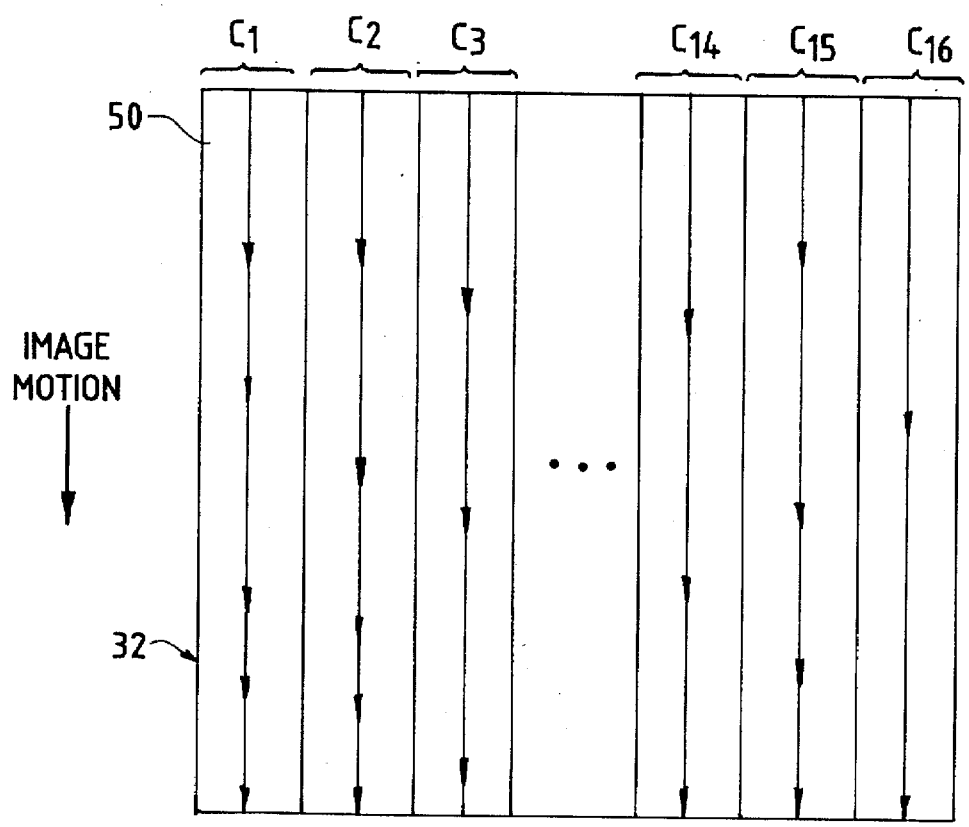
FIG. 14A is a schematic diagram of the array 32, of FIG. 5, showing how image velocities may vary both in the column direction within a column group due to terrain variations in the direction of flight, and also across the array from one column group to another due to terrain variations across the line of flight.

FIG. 14A is a schematic diagram of the array 32, showing how image velocities may vary both in the column direction within a column group due to terrain variations in the direction of flight, and also across the array from one column group to another due to terrain variations across the line of flight. Terrain variation across the line of flight are accounted for by the arrows, representing charge transfer rates, varying across the column groups 50 C1, C2, etc. Terrain variations in the line of flight direction are represented by the varying lengths of arrows within each column. Referring to FIG. 4, it will be seen that terrain variations in the direction parallel to the sides AB and CD of the scene will result in varying image velocities in the column direction. Using the example of column C1, the terrain may be such that the object displacements in the top region of the column (and resulting image velocities) may be greater than at the bottom of the column.

The invention compensates for terrain variation in the line of flight (along-track) direction by conducting the correlation processing in a plurality of discrete regions (rows) of the column selected for correlation processing to determine the object translation in the discrete regions, and then intelligently selecting from the various translations an particular translation to assign to the column group. The selected value may, for example, be the average of the displacements, or the most frequently occurring translation. The number of regions or rows in which the column is subdivided may vary from one column group to the next, or from one image to the next as the charge transfer rates are continually updated.

Figure 14B:
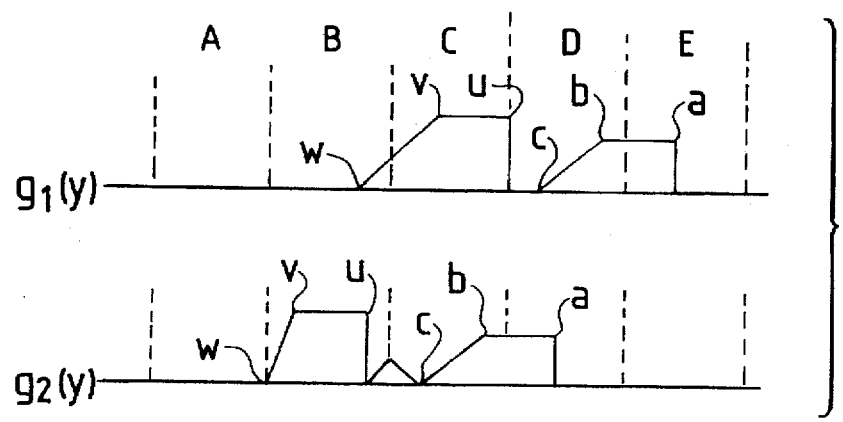
FIG. 14B is a schematic representation of two successive overlapping images which are partitioned into five groups of rows A–E, the correlation procedure being performed in each of the groups.

While most reconnaissance imagery is indeed piecewise flat (e.g. buildings, ponds, roads, etc.), there exists instances when this may fail (e.g. a building viewed at an aspect angle). Where the terrain is not flat, the $\nabla R$ term in (3) is important and the scaling becomes non-uniform. FIG. 14B illustrates the scaling problem with two overlapping images (of a rectangular object viewed from a left aspect): the uv-region, being flat (i.e., $|\nabla R(x)| \ll 1$ for $v < x < u$), does not change its scale between successive exposures as does the vw-region. Moreover, objects once hidden behind u are now visible.

If the two images in FIG. 14B were used in estimator (4c), the two functions would be simply translated versions of each other, if and only if 5.1. Their correlation [the first estimator in (4c)] is symmetric about that lag d which (5) maximizes the correlation; or 5.2. Their Fourier ratio [the second estimator in (4c)] is identical at all spatial frequencies k where the ratio is defined.

However, if neither condition 5.1 or 5.2 exists, we know that the image in question has, in fact, been geometrically distorted and, thus, must contain one or more regions with variable height profiles.

Again, one method, then, to deal with the image distortion problem is outlined in FIG. 14B. Here, the first image (constituting of N pixels in the column direction) is partitioned into M=5 regions labeled A–E (each region contains N/M pixels in the column direction). These regions may be pre-defined, chosen at random or derived from in-flight imagery. Each region in $g_1$ can now be correlated against $g_2$; however, only those regions that properly correlate [i.e. estimator (4c) with requirement (5) met] are retained. When complete, this process will have performed N correlations, each of length N/M; at most, M estimates will have been retained of the residual velocity throughout the image. Then, the translation distance d and hence image velocity for the column group is selected from the M estimates.

Figure 15:
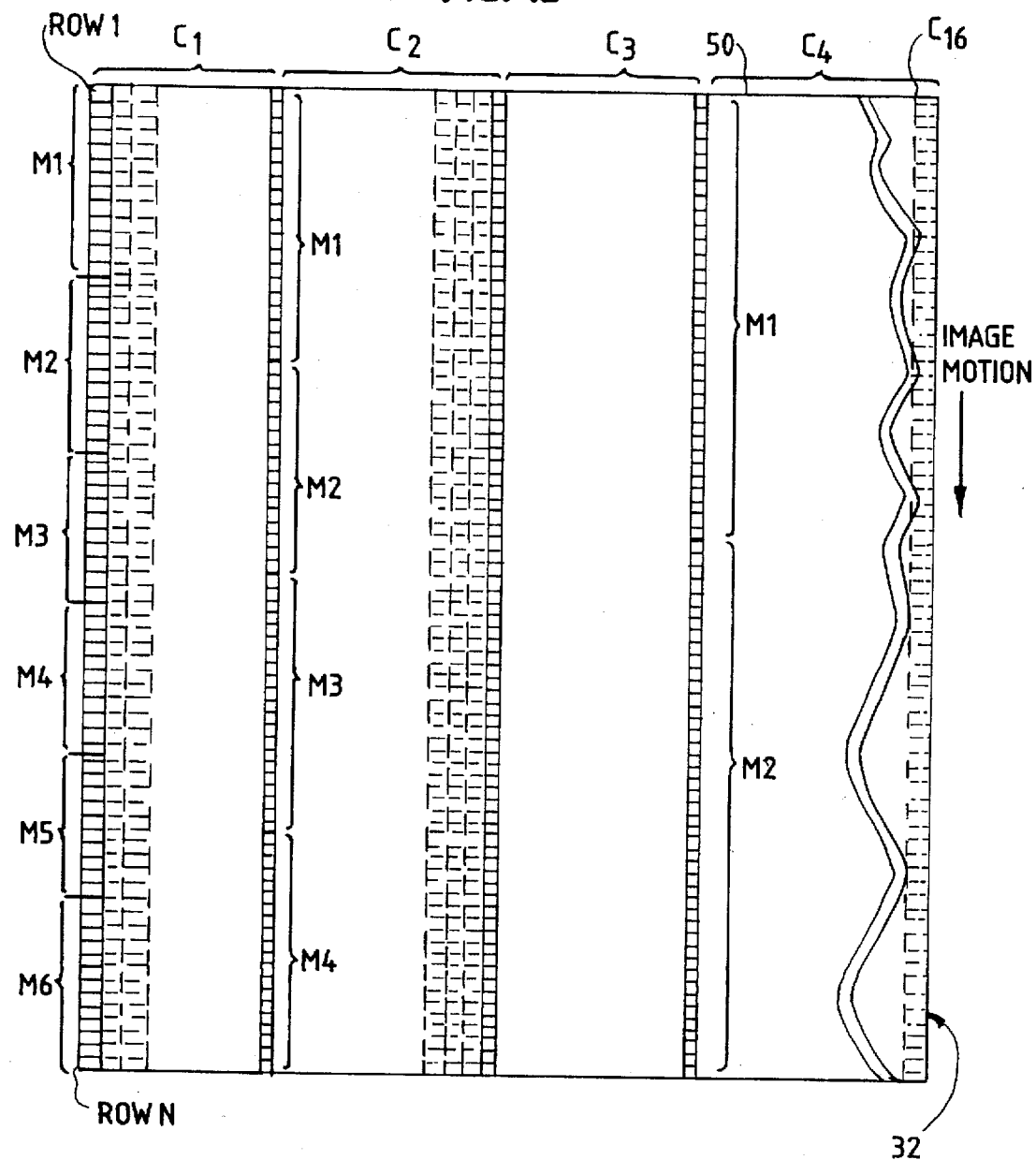
FIG. 15 is a schematic diagram of a portion of the array 32, showing how the column used for determining image transfer rates may be separated into discrete row groups M, in which the correlation between successive images takes place in the groups $M_i$ to correct for image motion variation in the column direction as shown in FIG. 14.

As an example of this procedure, FIG. 15 is a schematic diagram of a portion of the array 32, showing how the column used for determining image transfer rates may be separated into discrete row groups or regions M, in which the correlation between successive images takes place in the groups $M_i$ to correct for image motion variation in the column direction. The column in group C1 used for correlation processing is subdivided into 6 row groups $M_1$–$M_6$. The column in group C2 is divided into four groups, the column in group C3 is not divided (M=1), and so on. It will be further understood that the separation of the columns into M groups of N/M rows is preferably performed by the signal processing unit 56 grouping the incoming serial data stream into M packets of data representing the pixel information in a certain row of a specific column, not by a physical modification to the array 32. The correlation routine is then performed on the M groups, the resulting image displacements are compared, and a displacement and ultimately the residual image velocity $U_\delta$ is selected for the column group.

In summary, a preferred profiled FMC procedure for both along-track and cross-track terrain variations is as follows:

6.0. Set initial transfer velocity $U_0$ using (4b) for some initial range estimate.

6.1. Default the transfer velocity U to $U_0$; the counters are set using (*1).

6.2. Get the first image $g_1(y)$.

6.3. Repeat indefinitely 6.4. Get the second image $g_2(y)$.

6.5. For each cross-track angle (i.e. column group) of interest 6.6. Partition the first image into M regions. (6)

6.7. Compute $U_\delta(m)$ using (4c) and (5) for m=1 ... M.

6.8. Retain only the most frequently occurring $U_\delta$.

6.9. Update U using (4a) given $U_\delta$; reset $U_0$ to U; reset counters using (*1).

6.10. Copy the second image $g_2(y)$ into the first $g_1(y)$.

6.11. End 6.5

6.12. End 6.3

It is reasonable to set the initial velocity in (6.0) using a graded earth assumption. Thus, for side oblique operation $$R_0(\theta) = \frac{H}{\sin(\delta + \theta)} \quad (*3)$$

can be used in (4b) where $\delta$ is the side depression angle and where $\theta$ is the cross-track field angle (from the optical axis) to the column group of interest. In forward oblique mode, we use $$R_0(\theta) = \frac{H}{\sin^2(\phi)} \quad (*4)$$

for all field angles θ where φ is a nominal forward depression angle. The center of each column group has a field angly given by $$\theta = \tan^{-1}\left(\frac{P}{F}\left[\frac{(2n-1)N/\text{Sectors}+1}{2} - \frac{1+N}{2}\right]\right) \quad (*5)$$

where n=1 ... sectors is a column group index and sectors is the number of column groups. Of course, one must replace U, $U_o$, $U_\delta$ and d by U(θ), $U_o$(θ), $U_\delta$(θ) and d(θ) in the foregoing equations.

Procedure (6) is but one way to correlate variable scaled imagery. The present invention, however, should not be considered limited to this approach. For example, it may prove useful to correlate the entire image, then recursively divide the image into smaller regions each time (4c) fails (5). This approach would replace steps (6.6–6.7) and would provide the estimator (4c) with correlation sequences of maximum length; thus maximizing the accuracy (*2).

C. Range from motion

It will be further appreciated that the correlation of successive images as disclosed herein may be used as a method for passively determining the range R from a moving object (e.g., an aircraft) to a remote stationary point, such a location on the ground. The method for passive determination of range comprises the steps of first generating successive images of the stationary point by a camera having a focal length F and a known pixel information transfer rate; converting the successive images to digital form; processing the digital images by performing the correlation algorithm (4c) to estimate the residual image velocity of the fixed point; and then computing the range R, where $$R(\theta) = \frac{F}{\cos\theta} \frac{V}{U(\theta)}$$

F is the focal length;
V is the velocity of the aircraft;
θ is the cross track field angle to the column group of interest as given by (*5);
U(θ) is the estimated image velocity determined by (4a–c).

The initial estimate of range $R_0$(θ), see (*3) or (*4), may be obtained from the flat-earth approximation discussed above where the camera depression angle, height and field of view information is known, or from some other source. The estimated residual image velocity is derived from the correlation of the successive images, as discussed in detail previously.

The passive rangefinding of the present invention permits estimates of range to be obtained with relative security. Active range finding techniques typically involve radar or laser technology, which can be detected from the ground and may result in a hostile response.

III. Alternative Embodiment of the Invention

Figure 16:
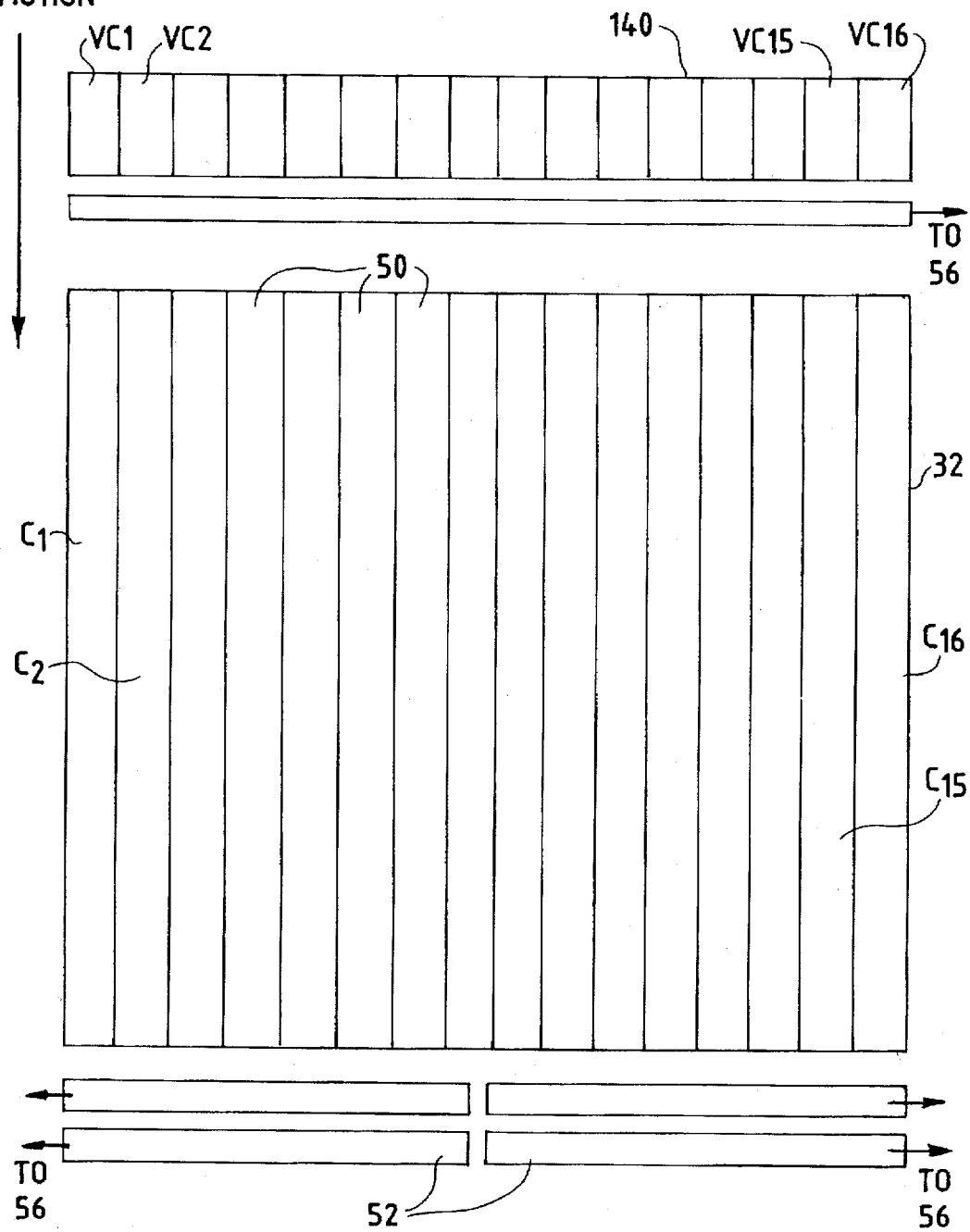
FIG. 16 is a schematic drawing of an alternative embodiment of the invention in which a velocity estimator array 140 is placed above the array 32 of FIG. 5, such that radiation from a fixed point of the scene impinges upon the velocity estimator array prior to impinging upon the array 32.

The preferred embodiment described above uses successive frames of imagery from the array 32 to determine the charge transfer rates. An alternative is to use a separate array for the purpose of generating the two images that are used in the correlation procedure. FIG. 16 is a schematic drawing of an alternative embodiment of the invention in which a separate velocity estimator array 140 is placed above the array 32 of FIG. 4, such that radiation from a fixed point of the scene impinges upon the velocity estimator array 140 prior to impinging upon the array 32. The velocity estimator array 140 is arranged in a plurality of velocity estimator column groups VC1, VC2, ... VC16 which are aligned with the sixteen column groups 50 of the array 32. The column groups VC1, VC2 could consist of a single column of pixels of length N. It is anticipated that N=200 will suffice.

The column groups $VC_i$ are used for generating successive images for use in the correlation process described previously. In this embodiment, the output of the array 32 is not subject to signal processing to compute the updated charge transfer rates. Moreover, since the columns VC1–VCn are preferably positioned relative to the array such that scene information impinges on the velocity estimator array prior to impinging on the array 32, the correlation process and calculation of the charge transfer rates can be performed prior to the generation of the first image of the scene from the array 32, insuring that the first frame of imagery from array 32 is performing a profiled forward motion compensation function.

In operation, the method consists of generating first and second images of the scene from the velocity estimator array 140, the second image generated at time T after the generation of the first image. The images are digitized and stored in the signal processing unit 56. For each of the column groups $VC_i$, the images are correlated to derive the image velocity of the scene in each of the velocity estimator column groups. Since the column groups $VC_i$ are in alignment with the corresponding column groups of the array 32, the derived image velocities can be used to calculate the charge transfer rates for each of the column groups of the array 32. Pixel information is then transferred through each of the column groups of the array 32 cells at a rate substantially equal to the derived image velocity for the corresponding velocity estimator array column groups, preserving resolution of an image created from array 32. The general procedure (6) can be used to calculate the charge transfer rates from the output of the array 140.

Figure 17:
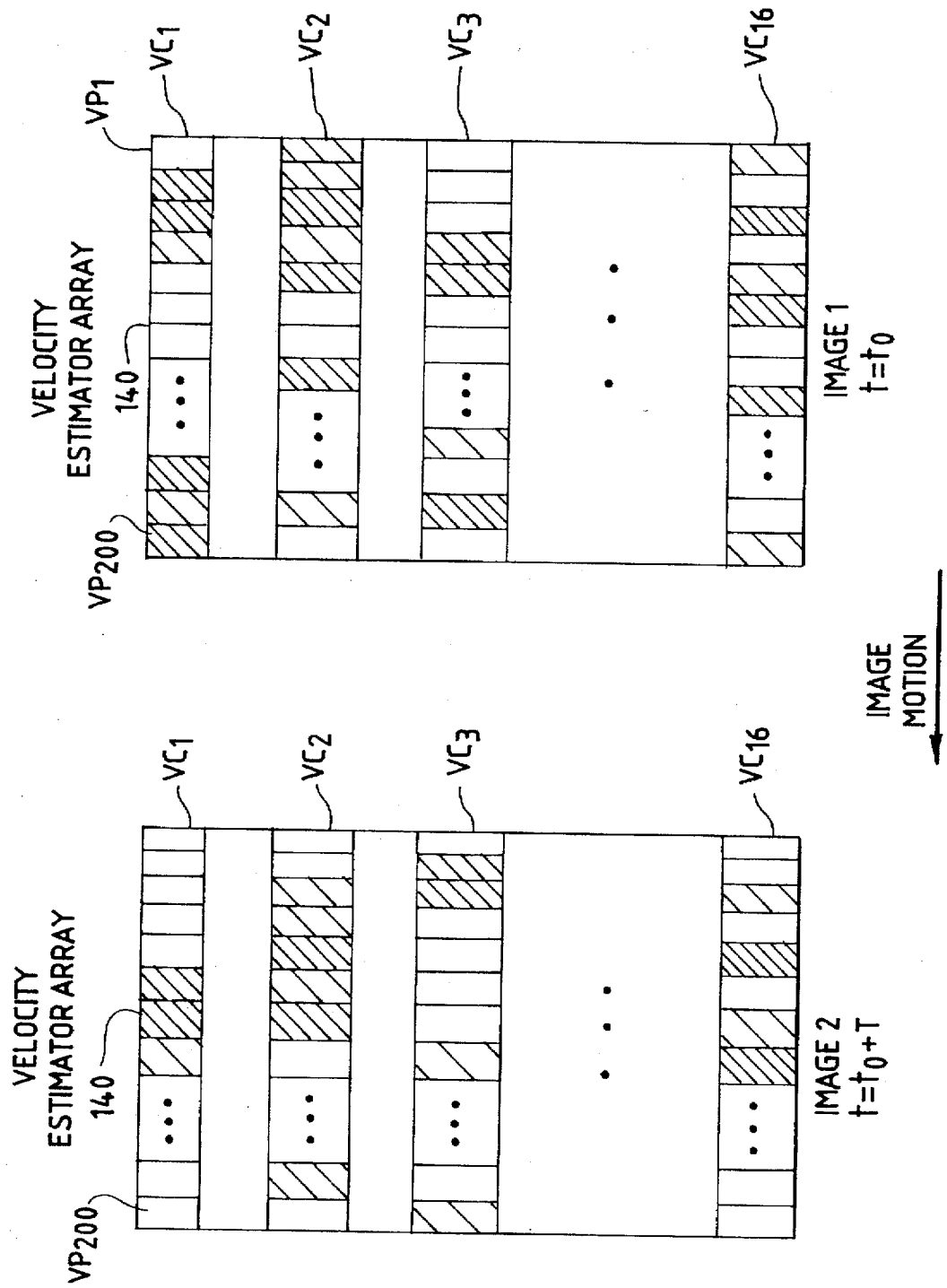
FIG. 17 is an illustration of two successive images generated the velocity estimator array of FIG. 16, showing the displacement in the plane of the velocity estimator array of fixed points in the scene in each of the array's 16 columns.

To illustrate the method, and referring to FIG. 17, two successive images generated the velocity estimator array of FIG. 16, are shown. The displacement of points in the scene (as computed by the correlation process) is 4 rows in column VC1, 2 rows in column VC2, 2 rows in column VC3, and so on. As was the case when the image from the array itself is used for the correlation processing, each of the velocity estimator column groups $VC_i$ may be subdivided in the signal processing into M groups for the purpose of determining the residual image velocities in a plurality of locations in the column direction within each column to take into account terrain variations in the line of flight direction.

IV. System Operation

A. Side-oblique operation

As an example of the system's operation in the preferred embodiment of the invention, let us assume the following parameters:

aircraft velocity V=480 knots=215.88 m/s,
aircraft altitude H=400 ft=121.92 m,
sensor focal length F=1.5 in=38.10 mm,
side depression angle δ=30°,
number of image elements N=2048,
element size P=12 μm,
number of regions M=8,
exposure time Δt=10 ms,
picture event time T=400 ms,
line readout rate Read rate=4M lines/s,
number of sectors (column groups) Sectors=16,
readout ports Output ports=4,
master clock frequency X=10M Hz.

Using these values in (*5), the sensor's field of view is FOV=35.75°. Generally, the FOV=2 arctan (NP/2F), (i.e., length L=NP in FIG. 5). To simplify this example, we will assume that terrain remains relatively flat in the along-track direction. The left hand side of Table 1 shows the counter values, line transfer rates, initial image transfer velocity corresponding to initial (graded earth) range estimates, and the updated image transfer velocity, line transfer rate and counter value to the array based on the initial date. The variable, equation, profiled FMC step and units associated with each quantity are provided in the heading of Table 1 where applicable.

The "initial image transfer velocity" column will always contain negative values as the image is being transferred opposite to the direction of aircraft motion. High "number of line transfers" indicate both the relevance of forward motion compensation as well as the potential image smear introduced when rates are mismatched. "Actual ranges" were taken at random to illustrate the procedure. Finally, the amount of "image smear" is also provided. The smear (present in the first two images) is minimized in the subsequent image given the updated line rates.

To compute the "estimated lags" in Table 1, the processor must correlate regions of the first image against the second image. This procedure is fully specified in (6). The time it takes to process this information must fit into the time reserve $$T - N^2 \frac{1}{\text{Outputports}} \frac{1}{\text{Readrate}} - \Delta t \sim 100 \, ms$$

between each picture event.

Table 2 shows that, for M=8, the total time to execute (6) is 3.69 ms using the second estimator in (4c). Since the total processing time 3.69 ms/sector×16 sectors<100 ms (the time between successive exposures in the example) the Fourier estimator (4c-2) can be used. However, the correlation estimator in (4c-1) could not be used with a 30M flop/s processor, since the total processing time, 34.95 ms/sector× 16 sectors>100 ms. If correlation estimator (4c-2) is used with M=8, a processor with greater processing power would be required. Table 2 illustrates that the Fourier estimator (4c-1) can perform the correlation routine faster, giving more flexibility to the design, and it is generally preferred over the correlation estimator (4c-2).

TABLE 1

| Image | | | | Initial | | | | Estimates | | | Updated | | |
|---|---|---|---|---|---|---|---|---|---|---|---|---|---|
| column group index | field angle | actual range | range estimate | transfer image velocity | line transfer rate | counter value | number of xfers | lag | residual image velocity | image smear | transfer image velocity | line transfer rate | counter value |
| $\eta$ | $\theta$ | R | $R_0$ | $U_0$ | LTR | CV | LTR$\Delta t$ | d/P | $U_\delta$ | $U_\delta \frac{\Delta t}{P}$ | $U_0$ | LTR | CV |
| (*5) (6.0) # | (*5) (6.0) degrees | (1) m | (*3) (6.0) m | (4b) (6.0) mm/s | (*1) (6.1) lines/s | (*1) (6.1) # | (4c) (6.7) lines | (4c) (6.7) lines | mm/s | (3) lines | (*1) (6.9) mm/s | (*1) (6.1) lines/s | (6.1) # |
| 1 | −16.82 | 291.62 | 534.84 | −17.59 | 1465.87 | 6822 | 14.66 | 489 | 14.67 | 12.23 | −32.26 | 2688.37 | 3720 |
| 2 | −14.68 | 361.74 | 461.57 | −20.38 | 1698.58 | 5887 | 16.99 | 188 | 5.64 | 4.69 | −26.02 | 2168.58 | 4611 |
| 3 | −12.50 | 274.60 | 405.49 | −23.20 | 1933.49 | 5172 | 19.33 | 369 | 11.07 | 9.22 | −34.27 | 2855.99 | 3501 |
| 4 | −10.28 | 319.38 | 361.37 | −26.03 | 2169.55 | 4609 | 21.70 | 114 | 3.42 | 2.85 | −29.45 | 2454.55 | 4074 |
| 5 | −8.03 | 265.27 | 325.91 | −28.87 | 2405.65 | 4157 | 24.06 | 220 | 6.60 | 5.50 | −35.47 | 2955.65 | 3383 |
| 6 | −5.76 | 237.19 | 296.91 | −31.69 | 2640.61 | 3787 | 26.41 | 266 | 7.98 | 6.65 | −39.67 | 3305.61 | 3025 |
| 7 | −3.46 | 206.46 | 272.87 | −34.48 | 2873.26 | 3480 | 28.73 | 369 | 11.07 | 9.22 | −45.55 | 3795.76 | 2635 |
| 8 | −1.15 | 233.47 | 252.71 | −37.23 | 3102.39 | 3223 | 31.02 | 102 | 3.06 | 2.56 | −40.29 | 3357.39 | 2979 |
| 9 | 1.15 | 310.62 | 235.66 | −39.92 | 3326.86 | 3006 | 33.27 | −321 | −9.63 | −8.03 | −30.29 | 2524.36 | 3961 |
| 10 | 3.46 | 295.84 | 221.12 | −42.55 | 3545.57 | 2820 | 35.46 | −358 | −10.74 | −8.95 | −31.81 | 2650.57 | 3773 |
| 11 | 5.76 | 200.98 | 208.65 | −45.09 | 3757.53 | 2661 | 37.58 | 57 | 1.71 | 1.43 | −46.80 | 3900.03 | 2564 |
| 12 | 8.03 | 243.08 | 197.89 | −47.54 | 3961.83 | 2524 | 39.62 | −295 | −8.85 | −7.36 | −38.69 | 3224.33 | 3101 |
| 13 | 10.28 | 187.73 | 188.57 | −49.89 | 4157.73 | 2405 | 41.58 | 7 | 0.21 | 0.19 | −50.10 | 4175.23 | 2395 |
| 14 | 12.50 | 268.04 | 180.46 | −52.14 | 4344.59 | 2302 | 43.45 | −568 | −17.04 | −14.20 | −35.10 | 2924.59 | 3419 |
| 15 | 14.68 | 301.16 | 173.38 | −54.26 | 4521.94 | 2211 | 45.22 | −767 | −23.01 | −19.19 | −31.25 | 2604.44 | 3840 |
| 16 | 16.82 | 215.35 | 167.19 | −56.27 | 4689.47 | 2132 | 46.89 | −420 | −12.60 | −10.49 | −43.67 | 3639.47 | 2748 |

TABLE 2

Array = 2048 × 2048
Processor = 30M flops/s
Readout = 4M lines/s
Sectors = 16

| | | | | Processing Time | | | | | |
|---|---|---|---|---|---|---|---|---|---|
| | | | | | Fourier Estimator (4c-2) | | | Correlation Estimator (4c-1) | |
| regions per sector | region length | | | | | time (ms) | | | time (ms) |
| M | N/M | $\frac{\Delta U_\delta}{U_\delta}$ % | $\log_2(N)$ | flops | operations | per region | per sector | operations flops | per region | per sector |
| 1 | 2048 | 0.05 | 11 | 135168 | 4.51 | 4.51 | 8388608 | 279.62 | 279.62 |
| 2 | 1024 | 0.10 | 10 | 63488 | 2.12 | 4.23 | 2097152 | 69.91 | 139.81 |
| 4 | 512 | 0.20 | 9 | 29696 | 0.99 | 3.96 | 524288 | 17.48 | 69.91 |
| 8 | 256 | 0.39 | 8 | 13824 | 0.46 | 3.69 | 131072 | 4.37 | 34.95 |

TABLE 2-continued

| Array = 2048 × 2048 Processor = 30M flops/s Readout = 4M lines/s | | | | Processing Time | | | | | |
|---|---|---|---|---|---|---|---|---|---|
| Sectors = 16 | | | | Fourier Estimator (4c-2) | | | Correlation Estimator (4c-1) | | |
| regions per sector | region length | | | | time (ms) | | | time (ms) | |
| | | | | operations | per | per | operations | per | per |
| M | N/M | $\frac{\Delta U_\delta}{U_\delta}$ % | $\log_2 (N)$ | flops | region | sector | flops | region | sector |
| 16 | 128 | 0.78 | 7 | 6400 | 0.21 | 3.41 | 32768 | 1.09 | 17.48 |

Shaded regions are not viable: processing time > available idel time (100 ms)
Processing time = per sector time × 16

Referring to FIGS. 2A-5, the operation of the imaging array in a side oblique mode to provide profiled forward motion compensation will be first discussed. When the operator is ready to begin taking pictures, he or she selects a depression angle δ (FIG. 2) to image the terrain scene of interest. At this time, avionics system 24 provides to computer 34 the velocity and height data.

The camera control computer 34 calculates the initial charge transfer rates for each column group according to step 6.0. The computer 34 then calculates the pre-load counter value for each counter CN in drive and control electronics 54 (FIGS. 6, 8).

The counters are then pre-loaded with the counter values over bus 64 (FIG. 8). When the operator triggers a frame to take a picture, the shutter is simultaneously opened for an exposure time period calculated by computer 34. In this example, the exposure time period is 0.01 second. At the same time, each counter in drive and control electronics 54 begins counting at the frequency X to its pre-loaded counter value. The counting may be up to the counter value or down to 0 from the counter value. When the counter counts the predetermined number of counts, a trigger signal is sent from the counter to the clock drive CD for that counter, and one cycle of 3-phase clocking as triggered in the corresponding column group. Pixel information (electric charge packets) containing scene information is thereby shifted down one row vertically in all the columns in that column group. p After issuing a trigger pulse to the clock driver, the counter CN then automatically reloads and begins counting to the counter value again. When the counter value is reached again, the trigger pulse is sent, the clock driver CD shifts the pixel information one row vertically in all the columns in the column group, the counter CN reloads and the cycle is performed again. Meanwhile, the cycles are also being performed in the other column groups. Because each column group has a different charge transfer rate and corresponding counter value in order to match the charge transfer rate to the image motion rate, electronic profiled forward motion compensation without moving parts is realized.

Although in the preferred embodiment the imaging array is divided into 16 column groups as a tradeoff between performance and cost, it may be desirable to use a 32 or higher column group regime. The more column groups there are, the less error (image smear) there is at the boundaries between adjacent column groups. However, with 32 column groups, there must be twice as many counters and clock drivers, as well as control lines, in the array. Moreover, the total processing time is increased, resulting in constraints on the selection of M row groups for correlation processing, or on the time elapsed between successive images. With fewer column groups, e.g., 8, the control circuitry and processing time is reduced proportionately, thus lowering cost, but image smear near the edges of the column groups may be unacceptable. The size of the array may be another factor when deciding how many column groups to use.

The first image is read out of the array 32, digitized, and fed to the signal processing unit 56, where it is stored in RAM 112. The process is repeated a second time, at an interval of length T later than the generation of the first image. The counter values $CV_i$ for each counter (and for each column group) for the second exposure are listed in Table 1 on the left hand side. The second image is digitized and stored in RAM2 114 of the signal processing unit 56. The correlation algorithm set forth in procedure (6) above is performed to arrive at updated charge transfer rams for the column groups. The resulting updated charge transfer rates are then calculated, as shown on the right hand side of Table 1.

Using column group 9 for illustration, during the exposure time period, the image moves at a rate of 39.92 mm/s or down 33.26 rows (0.012 mm pixels) in 10ms for each of the columns in column group C9; thus, pixel information or charge packets representing scene information must be shifted vertically down the columns of the column group by 33.26 pixels during a 10 ms exposure. More precisely, the charge packets must be removed by one pixel in the vertical direction every 0.01/33.26 seconds.

To do this, counter CN9 for column group C9 is loaded with its particular counter value. If the master clock frequency is 10 MHz, or 100 ns/count, then the integration time of 0.01 seconds results in 100,000 master clock counts in the exposure time period. Thus, the counter value for column group C9 is 100,000/33.26, or 3006. At the moment of opening the shutter, the counter, having been set to zero, begins to count at the master clock frequency up to 3006. At count number 3006 a match is obtained, and the clock driver CD9 (FIG. 5) is triggered. The charge packets in all the columns of column group C9 then are shifted by one row vertically. Counter CN9 is reset to zero and begins counting up to 3006 again. Thirty-three full cycles of counting and triggering are obtained in the exposure period, and during the remainder of the integration time, no more clock cycles are triggered.

In the present example, note that if the exposure time period is reduced to 0.005 second, the image motion becomes 33.26/2 or 16.33 pixels during the integration time, and the total of master clock counts during exposure is halved as well to 50,000. However, the counter value remains the same. Thus, the exposure period is not critical to the implementation of the invention, and can be varied by the operator without affecting the profiled forward motion compensation.

Note further that the charge transfer rates for the third exposure in a sequence of exposures are derived from the correlation of the first two exposures from the array, which were based on estimates of the range. Generally speaking, the third exposure should have significantly reduced image smear since the residual image velocity is being driven to zero as a result of the correlation procedure. The transfer rates for the fourth exposure are based on the third and second exposures (the third image based on a correlation of the first two images), and the fifth exposure is based on the third and fourth exposure (both of which are based on correlation of previous images). As successive images are continuously generated from the array, the error in the charge transfer rates is minimized between successive exposure.

In aerial reconnaissance, particularly in military reconnaissance missions over hostile terrain, there are situations where the time for exposure of the array to the scene must be minimized, and hence image resolution from first two images is critical. In this situation, the alternative embodiment of the invention may prove more advantageous. The first two images from the velocity estimator array 140 are used to generate the charge transfer rates for the array 32. Exposure of the array 32 is timed to occur after the scene has first passed over the velocity estimator array 140 and after two successive images of the scene have been generated by the velocity estimator array 140. Obviously, the dimensions of the columns $VC_i$ in the column direction, and the separation distance from the bottom of the columns $VC_i$ to the top of the array 32 must be known so that the lag between the second exposure of the velocity estimator 140 and the opening of the shutter for the array 32 is timed properly.

B. Forward Oblique Operation

Figure 18:
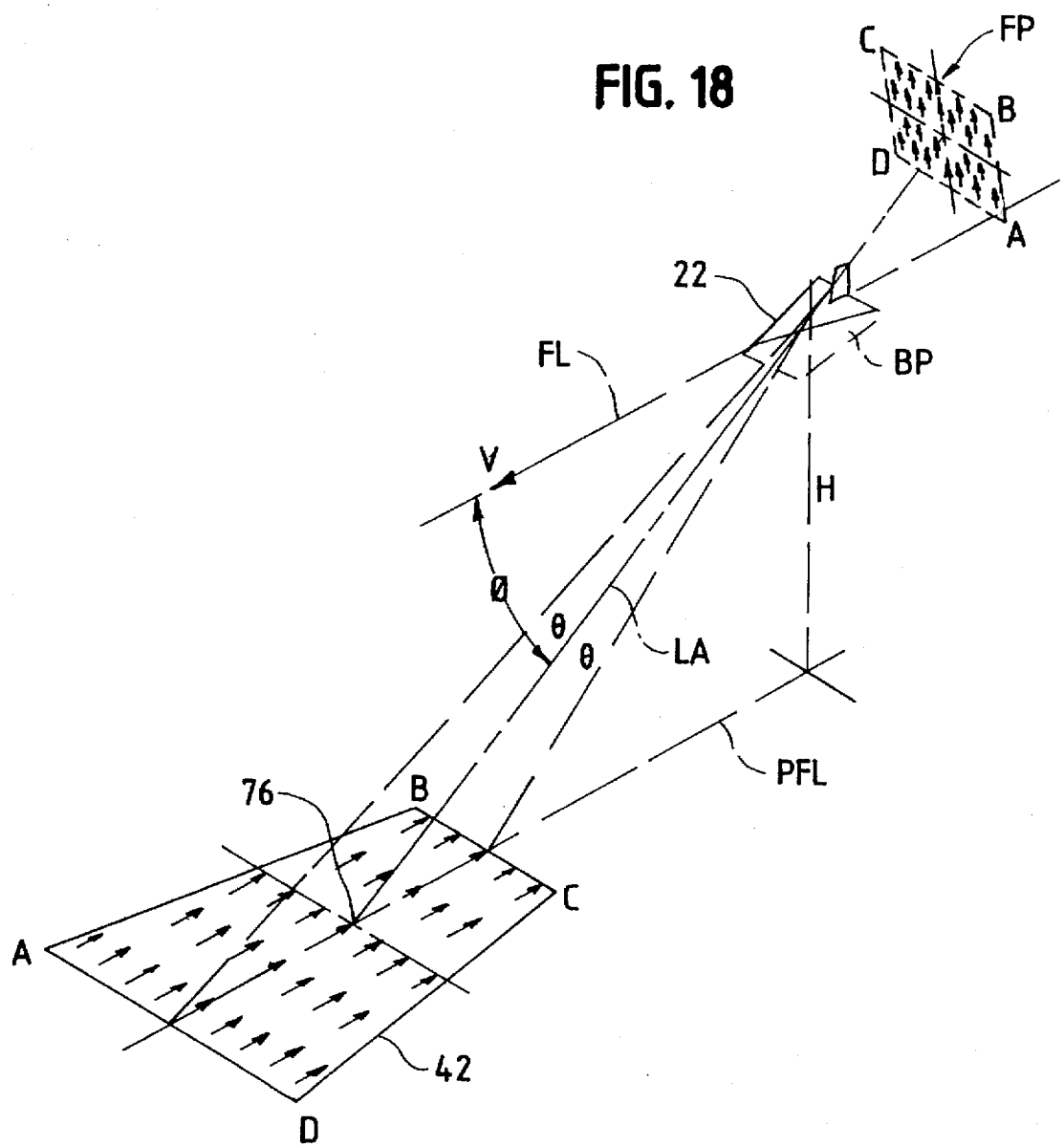
FIG. 18 is a schematic drawing of a reconnaissance aircraft operating in a forward oblique mode and illustrating the focal plane of the camera assembly of FIG. 2B greatly enlarged and displaced in order to clearly show the relationship between the focal plane and a scene of interest, and the transfer of charge in the portion of the array near side A–B at a faster transfer rate to compensate for the terrain variations occurring in the corresponding portion of the scene of interest.

The imaging array 32 may be used to provide forward motion compensation in a forward oblique framing mode. Referring to FIG. 18, the terrain of interest 42 is located directly forward of aircraft 22. The depression angle δ represents the angle between plane BP and lens axis LA that intersects the center of the terrain of interest 42. In the forward oblique mode, the image velocity across array 32 (i.e., transverse to the direction of flight) may not be constant for narrow fields of view when large differences in terrain variation occur across the field of view, as indicated in FIG. 18. Moreover, the image motion rates may appear faster for the terrain that is closest to the aircraft 22.

To maximize image resolution, the image velocity near the center of the array may be chosen, and the charge transfer rate down the all the column groups of the array is selected to be synchronized at this rate. This provides a selection which is correct at one point and a "best fit" compromise for other points in the array. Of course, other points could be chosen and the charge transfer rate selected to be synchronized at those points. The image velocity ($U_i$), and thus the charge transfer rate, is given by:

$$U(\theta) = F \frac{(V)}{(H)} \sin^2(\phi \pm \theta)$$

where F is the focal length of lens 40 and ($\phi \pm \theta$) is the forward depression angle of the point chosen for synchronization for forward motion correction. The charge transfer rate in all the column groups is the same in the forward oblique mode. Thus, array 32 is organized into one column group. Computer 34 calculates the line transfer rate, LTR, which is given by:

$$LTR = \frac{F}{P} \frac{V}{H} \sin^2(\phi \pm \theta)$$

The counter values for all the counters are the same, and are given by $$\frac{X}{LTR}$$

where X is the master clock frequency. After the counter values are loaded into the counters (FIG. 5) and shutter 41 opens, counters CN begin counting, and clock drivers CD are triggered. When a match is obtained, the counters reload, and the cycles are repeated as in the side oblique mode.

C. Further Examples

Figure 19:
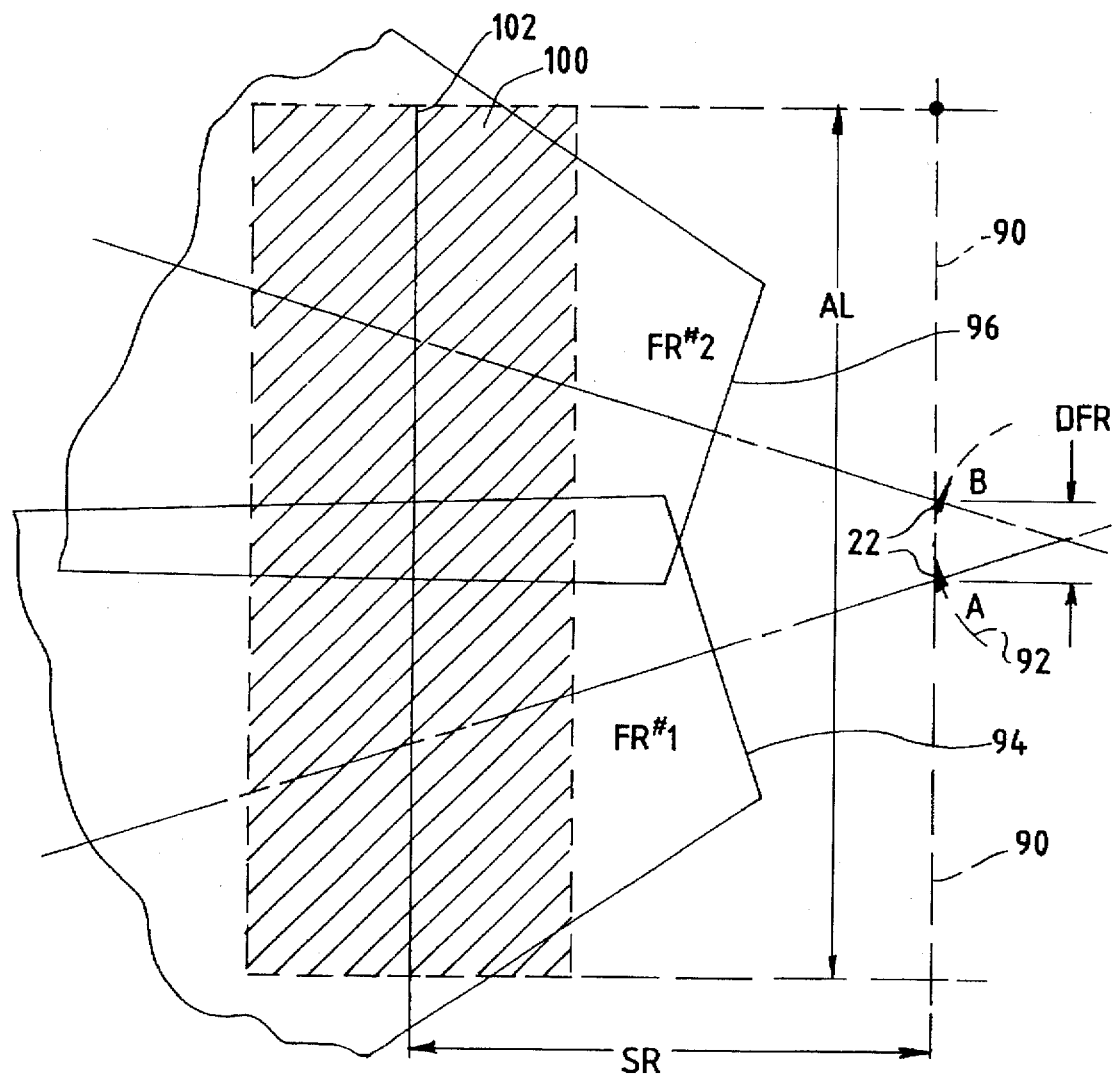
FIG. 19 is a schematic diagram of a side oblique reconnaissance application of the present invention, showing the time advantage of the electro-optical camera assembly of FIG. 2B as compared to a prior art linear array.

A practical advantage of the present invention can be seen in the illustration of FIG. 19 which represents a hypothetical reconnaissance scenario in which aircraft 22 is assigned to record the image of an airstrip 100 under hostile control having a length AL of 11,000 feet, a width of about 4,000 feet and defining a centerline 102. In order to properly record the airstrip, aircraft 22 is scheduled to fly at an altitude of 4,000 feet, at a velocity of 810 feet/second, and at a standoff range SR of 6,500 feet from centerline 102. At standoff range SR, the slant range from aircraft 22 to centerline 102 is 7,632 feet. The lens used in aircraft 22 has a focal length of 60 mm and is oriented at a depression angle δ of 31.6°. The field of view is 43.6° and Θ therefore is 21.8°. Array 32 is 48 mm along each side.

For a prior art linear charge-coupled device with "push broom" operation to image airstrip 100, it would have to fly the entire length of the zone of interest at the standoff range of 6,500 feet along a flight path 90. The aircraft would be exposed to hostile fire for 13.6 seconds (i.e., 11,000 feet/810 feet per second) and during that time would have to fly steadily along flight path 90.

In contrast, an aircraft 22 travelling at the same speed, but using the imaging array of the present invention, could sweep in along a path 92 and take two frame pictures 94 and 96 at points A and B, respectively, to cover airstrip 100. When picture 94 is taken at location A, aircraft 22 is operating in a side oblique mode at standoff range SR, but oriented at a small angle with respect to the center axis of the airstrip. Picture 96 can be taken at location B, while aircraft 22 is coming out of arc 92. Aircraft 22 travels only distance DFR of about 1,000 feet along path 92 between points A and B. As a result, exposure to hostile threats is reduced to only 1.23 seconds (i.e., 1,000 feet/810 feet per second). Thus, by using the present invention, the exposure of reconnaissance aircraft 22 to enemy threats during imaging is reduced dramatically. The scenario of FIG. 18 is one example of where a secondary velocity estimator array (one embodiment of the invention) may be advantageous, to insure that the first image 94 accounts for terrain variations in the scene. In the embodiment of the invention without the secondary velocity estimator array, two exposures may be taken immediately prior to the first picture 94 and the second picture 96 in order to derive the charge transfer rate for the pictures 94 and 96.

CONCLUSION

The foregoing description of the preferred and alternative embodiments has assumed that the imaging array 32 is a single, monolithic detector. It is possible to make a detector that is equivalent to the imaging array disclosed herein by piecing together in mosaic fashion smaller individual area arrays to make one large array. The individual arrays (perhaps 4, 20 or even 100) are electronically combined and include a means for organizing the columns in all the individual arrays into one or more column groups and a means for transferring pixel information located in the one or more column groups at one or more predetermined transfer rates. One such array that could be used as an element of the "mosaic" is the Thomson CSF THX 31157 charge-coupled device. In the mosaic, each charge-coupled device could be separately controlled as an individual column group. In the appended claims, the term "array" is accordingly intended to include either a single, monolithic array or an array composed of individual arrays electronically, optically or physically combined together, or individual discrete detectors mounted in a hybrid mosaic array.

While the foregoing description of the preferred embodiment has set forth an exemplary method and apparatus for achieving motion compensation in an electro-optical imaging array, those of ordinary skill in the an will appreciate that many alternatives can be used without departing from the spirit and scope of the invention as defined in the appended claims. For example, digital electronic control circuits other than those disclosed can be used to control the charge transfer rates in the column groups of an imaging array. Moreover, analog circuits, delay circuits, or other types of control circuits may be devised to control the charge transfer rates to achieve forward motion compensation. In addition, many of the functions performed by the disclosed digital electronic control circuits can be implemented in software by computer 34 or another data processor. As previously noted, alternative architectures for an electro-optical imaging array may be chosen. Additionally, other types of correlation algorithms than (4c) may be used to calculate the residual image velocity. The present invention, as defined in the appended claims, is intended to cover all such modifications and alternative implementations.

What is claimed is:

1. In a system comprising a passive array of cells arranged in rows and columns for generating pixel information representing a scene, a method for practicing image motion compensation while generating images with said array of cells in a manner so as to compensate for scene topography variations during exposure of said array of cells to radiation from said scene, comprising the steps of:

generating first and second images of said scene with said array of cells, said second image generated by said array of cells at a later point in time from the generation of said first image and having associated with it a second image transfer rate $U_0$ to compensate for forward motion of said array relative to said scene;

deriving from said first and second images an image correction velocity $U_S$ of at least one point in said scene relative to said array in the plane of said array of cells;

generating a third image of said scene with said array of cells, said third image generated at a point in time later than the generation of said second image; and in response to said derived image velocity from said first and second images, transferring pixel information through at least a portion of said array, during the exposure of said array to said scene to generate said third image of said scene, at a third image transfer rate substantially equal to $U_0-U_S$ derived from said first and second images;

whereby changes in image velocities in said array due to terrain variations are accounted for in said derived image velocity from said first and second images, adjustments of said second image transfer rate to derive said third image transfer rate may be made independent of aircraft navigation system inputs, and resolution of an image created from the array can be preserved.

2. The method, as claimed in claim 1, wherein said first and second images are generated from said array of cells, and said step of deriving the image velocity of said scene comprises the step of correlating said first and second images to determine the distance a fixed point in said scene is displaced in the plane of said array of cells between said first and second images.

3. The method, as claimed in claim 2, wherein said step of correlating said first and second images comprises the step of computing the Fourier spectrum of said first and second images.

4. The method, as claimed in claim 1, wherein said columns of said array are arranged in a plurality of column groups, and wherein said step of deriving the image velocity comprises the step of deriving, from said first and second images, the image velocity of portions of said scene which fall upon each of said column groups, and wherein said step of transferring pixel information comprises the steps of: calculating said pixel information transfer rate for each of said column groups from said derived image velocity for each column group, and transferring pixel information in each of said column groups at said calculated pixel information transfer rate for each column group.

5. The method of claim 4, wherein said array of cells is installed in a reconnaissance vehicle and said scene is in a side oblique orientation relative to the motion of said vehicle.

6. The method of claim 4, wherein said array of cells is installed in a reconnaissance vehicle and said scene is in a nadir orientation relative to the motion of the said vehicle.

7. The method, as claimed in claim 1, wherein the method further comprises the steps of deriving from said second and third images a fourth image velocity of said scene in the plane of said array, adjusting after generation of said third image, said rate of transfer of pixel information in said array depending on any difference between said derived image velocity and said fourth image velocity, exposing said array to said scene and generating a fourth image of said scene, and transferring pixel information through a portion of said array in accordance with said adjusted rate of transfer of pixel information during the exposure of said array to said scene to generate said fourth image.

8. The method, as claimed in claim 1, where the image correction velocity $U_S=d/T$, where d is the displacement of a fixed point in said scene in the plane of said array between said first and second images, and wherein T is the time elapsed between the taking of said first and second images.

9. The method of claim 1, wherein said cells of said array are arranged in rows and columns with said columns organized into a plurality of column groups, and wherein said first and second images are digitized and stored in a memory and wherein said step of deriving an image velocity comprises the step of dividing, in at least one of said column groups, said first and second images into a plurality of M row groups and correlating said M groups between said first and second images to determine the distance a fixed point in said scene is displaced in said array in each of said M groups between said first and second images.

10. The method as claimed in claim 9 and further comprising the step of comparing the displacements for each of said M groups and selecting a displacement value for said column group.

11. The method as claimed in claim 10, wherein said selected displacement value comprises the average of said displacements in said M groups.

12. The method, as claimed in claim 11, wherein said selected displacement value comprises the most frequently occurring displacement in said M groups.

13. The method, as claimed in claim 9, wherein said method further comprises the steps of adjusting the number of row groups M in said column group as the terrain in said scene changes.

14. In a system comprising a first passive array of cells arranged in rows and columns for generating pixel information representing a scene, said columns arranged in a plurality of first column groups capable of transferring pixel information in accordance with independent transfer rates, and a second passive velocity estimator array of cells generating pixel information, said velocity estimator may arranged in a plurality of velocity estimator column groups capable of transferring pixel information in accordance with independent transfer rates, said velocity estimator column groups aligned with said first column groups of said first array of cells, a method processing said pixel information from said velocity estimator array and said first array of cells which compensates for scene variation, comprising the steps of:

generating first and second images of said scene from said velocity estimator array, said second image generated at a later point in time from the generation of said first image and having associated with it a second transfer rate $U_{oi}$ in each of said velocity estimator column groups to compensate for forward motion of said velocity estimator array relative to said scene;

deriving from said first and second images the image correction velocity $U_{\delta i}$ of at least one point in said scene in the plane of said velocity estimator array in each of said velocity estimator column groups; and transferring said pixel information through each of said column groups in said first array of cells at a pixel information transfer rate substantially equal to $U_{o1}-U_{\delta 1}$ derived from said first and second images for the corresponding velocity estimator column groups;

whereby said pixel information transfer rate may be adjusted from said second transfer rate to said pixel information transfer rate for said first array independent of aircraft navigation system inputs and resolution of an image created from the pixels of said first array can be preserved.

15. The method, as claimed in claim 14, wherein said velocity estimator array is positioned relative to said array of cells arranged in rows and columns such that a fixed point in said scene impinges upon said velocity estimator array prior to impinging upon said array of cells, and wherein said step of deriving said image velocities is performed prior to the generation of an image from said first array of cells, thereby enabling pixel information in said first array of cells representing said fixed point in said scene to be transferred through said array at a rate substantially equal to $U_{oi}-U_{\delta i}$.

16. The method, as claimed in claim 14, wherein said step of deriving the image velocity of said scene comprises the step of correlating said first and second images to determine the distance a fixed point in said scene is displaced between said first and second images.

17. The method, as claimed in claim 16, wherein said step of correlating the step of computing the Fourier spectrum of said first and second images.

18. The method, as claimed in claim 14, wherein the method further comprises the step of adjusting, between third and fourth images generated by said array of cells, said rate of transfer of pixel information in each of said first array column groups depending on the changes in the terrain of portions of said scene imaged by said velocity estimator array group column groups.

19. Apparatus for processing pixel information representing an image of a scene to compensate for terrain variations in said scene comprising, in combination:

a passive first array of cells arranged in rows and columns capable of generating said pixel information, said columns organized into a plurality of column groups;

a passive velocity estimator array comprising an array of cells capable of storing pixel information, said velocity estimator array organized into a plurality of columns of pixels positioned in alignment with said column groups of said first array or cells, said velocity estimator array generating first and second sequential images of said scene;

means for processing said first and second images of said scene and for responsively deriving pixel information transfer rates for said column groups of said first array of cells, and means for transferring said pixel information within said first array at said pixel information transfer rates derived from said first and second images;

whereby said pixel information transfer rates for said first array of cells may be derived independent of aircraft navigation system inputs and resolution of an image created from said first array of cells can be preserved.

20. The apparatus as claimed in claim 19, wherein each of said columns of pixels of said velocity estimator array comprise a column of N rows of pixels, where N is less than or equal to the number of rows in said first array if cells, and wherein each column of pixels of said velocity estimator array provides images from which said processing means derives said pixel information transfer rate.

21. The apparatus as claimed in claim 19, wherein said column groups of said first array of cells comprise 16 column groups, and wherein said column groups of said velocity estimator array comprises 16 columns of pixels, and wherein each of said 16 columns of pixels of said velocity estimator array are aligned, in the direction of image motion, with a corresponding column group of said first array of cells.

22. The apparatus as claimed in claim 19 wherein said means for processing said first and second images comprises:

a memory storing digital information corresponding to said first and second images and a processing unit processing said digital information to determining the displacement of a fixed point of said scene in the plane of said velocity estimator array; and means responsive to said processing unit for determining a pixel information transfer rate for each of said first array column groups.

23. An aerial reconnaissance camera comprising, in combination:

a first passive array of cells capable of storing pixel information arranged in rows and columns, said columns arranged in a plurality of column groups;

a passive velocity estimator array comprising an array or cells arranged in a plurality of column groups;

means for determining pixel information transfer rates for said column groups of said first array of cells to minimize image smear due to terrain variations, comprising means for storing in digital format first and second images generated from said velocity estimator array;

means for correlating said stored first and second images, said second image generated at a later point in time from said first image; and a processor responsive to said correlation means which generates pixel information transfer rate signals for said column groups of said first array of cells derived from said first and second images and a image transfer rate $U_{oi}$ associated with said second image in each of said column groups of said velocity estimator array;

column transfer means responsive to said pixel information rate signals for transferring pixel information through said column groups of said first array as said pixel information transfer rates for each of said column groups;

whereby said pixel information transfer rates for said first array of cells may be derived independent of aircraft navigation system inputs and resolution of an image created by said first array of cells may be preserved.

24. An aerial reconnaissance camera comprising, in combination:

a passive first array of cells capable of storing pixel information arranged in rows and columns, said columns arranged in a plurality of column groups;

means for determining pixel information transfer rates for each of said column groups of said first array of cells to minimize image smear due to terrain variations comprising means for storing in digital format first and second images generated from said first array of cells, said second image generated at a later point in time from said first image;

means for correlating said stored first and second images; and a processor responsive to said correlation means which generates a pixel information transfer rate signal for said column groups of said first may of cells derived from said first and second images and an image transfer rate $U_o$ associated with said second image; and column transfer means responsive to said pixel information transfer rate signal for transferring pixel information through said column groups of said first array at said pixel information transfer rates for each of said column groups;

whereby said pixel information transfer rates may be adjusted from said second image transfer rate $U_o$ to said pixel information transfer rate independent of aircraft navigation system inputs, and resolution of an image created by said first array of cells may be preserved.

25. The apparatus of claim 24 or claim 23, wherein said column transfer means comprises a set of counter and clock drivers controlling the pixel information transfer rate for each of said column groups of said array, and wherein said pixel information transfer rate signal comprises a set of different counter values.

* * * * *